(12) United States Patent
Chung

(10) Patent No.: US 12,185,185 B2
(45) Date of Patent: Dec. 31, 2024

(54) METHOD FOR MANAGING WIRELESS CONNECTION OF ELECTRONIC DEVICE AND DEVICE THEREFOR

(71) Applicant: SAMSUNG ELECTRONICS CO., LTD., Suwon-si (KR)

(72) Inventor: Seungtaek Chung, Suwon-si (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 30 days.

(21) Appl. No.: 18/106,886

(22) Filed: Feb. 7, 2023

(65) Prior Publication Data
US 2023/0188934 A1 Jun. 15, 2023

Related U.S. Application Data

(63) Continuation of application No. PCT/KR2021/009170, filed on Jul. 16, 2021.

(30) Foreign Application Priority Data

Aug. 7, 2020 (KR) .................. 10-2020-0099437
Nov. 18, 2020 (KR) .................. 10-2020-0154930

(51) Int. Cl.
*H04W 4/02* (2018.01)
*G08B 21/24* (2006.01)
(Continued)

(52) U.S. Cl.
CPC ............ *H04W 4/025* (2013.01); *G08B 21/24* (2013.01); *H04W 8/005* (2013.01); *H04W 8/24* (2013.01); *H04W 76/10* (2018.02)

(58) Field of Classification Search
CPC ..... H04W 4/025; H04W 76/10; H04W 8/005; H04W 8/24; G08B 21/24
See application file for complete search history.

(56) References Cited

U.S. PATENT DOCUMENTS 8,068,412 B1* 11/2011 Cortez ............... H04J 14/0241
370/228
9,350,520 B2* 5/2016 Kondylis ............. H04L 5/0073
(Continued)

FOREIGN PATENT DOCUMENTS

CN 108683799 A 10/2018
CN 110191442 A 8/2019
(Continued)

OTHER PUBLICATIONS

Extended European Search Report corresponding to Application No. EP21853541.7; Mailing date of Dec. 19, 2023.
(Continued)

*Primary Examiner* — Chico A Foxx
(74) *Attorney, Agent, or Firm* — CANTOR COLBURN LLP

(57) ABSTRACT

An electronic device may include a communication module, a display module, at least one processor, and a memory. The at least one processor may: obtain state information of a first external electronic device on the basis of a first signal broadcast by the first external electronic device; when a control request for the first external electronic device is inputted, check whether the first external electronic device is connected to a second external electronic device through a common channel, on the basis of the state information; when the first external electronic device is connected to the second external electronic device through a common channel, transmit a control command corresponding to the control request by connecting to the first external electronic device using a dedicated channel. Other embodiments are possible for a method for managing a wireless connection of an electronic device and a device supporting the same.

14 Claims, 15 Drawing Sheets

(51) Int. Cl.
*H04W 4/06* (2009.01)
*H04W 8/00* (2009.01)
*H04W 8/24* (2009.01)
*H04W 76/10* (2018.01)
*H04W 76/14* (2018.01)

(56) References Cited

U.S. PATENT DOCUMENTS

| | | | |
|---|---|---|---|
| 9,819,710 B2* | 11/2017 | Anderson | G06F 3/048 |
| 9,848,299 B1 | 12/2017 | Kumar et al. | |
| 10,652,924 B2* | 5/2020 | Wentink | H04L 1/1867 |
| 10,735,907 B2 | 8/2020 | Lanes et al. | |
| 2004/0259538 A1* | 12/2004 | Agbegnenou | H04W 88/06 |
| | | | 455/422.1 |
| 2008/0010362 A1* | 1/2008 | Zhou | H04L 65/612 |
| | | | 709/219 |
| 2013/0040573 A1* | 2/2013 | Hillyard | H04W 8/005 |
| | | | 455/41.2 |
| 2013/0040574 A1* | 2/2013 | Hillyard | H04W 8/005 |
| | | | 455/41.2 |
| 2013/0124642 A1* | 5/2013 | Bansal | H04L 12/12 |
| | | | 709/206 |
| 2014/0178028 A1* | 6/2014 | Park | H04L 65/1093 |
| | | | 386/201 |
| 2015/0022350 A1 | 1/2015 | Hsu | |
| 2015/0195857 A1* | 7/2015 | Pan | H04W 4/80 |
| | | | 455/41.3 |
| 2015/0304603 A1* | 10/2015 | Yoon | H04N 7/147 |
| | | | 348/14.07 |
| 2015/0350766 A1* | 12/2015 | Schobel | H04L 65/1069 |
| | | | 381/77 |
| 2016/0080921 A1 | 3/2016 | Yadav et al. | |
| 2016/0359925 A1* | 12/2016 | Song | H04L 65/1069 |
| 2017/0063657 A1* | 3/2017 | Wang | H04L 43/0811 |
| 2017/0078786 A1 | 3/2017 | Schobel et al. | |
| 2017/0180915 A1* | 6/2017 | Adhikari | H04W 4/80 |
| 2017/0245047 A1* | 8/2017 | Schobel | H04W 76/25 |
| 2018/0006746 A1* | 1/2018 | Yasuzaki | H04H 20/08 |
| 2018/0061209 A1 | 3/2018 | Kumar et al. | |
| 2018/0109566 A1* | 4/2018 | Parikh | H04L 65/1089 |
| 2018/0124527 A1* | 5/2018 | El-Hoiydi | H04H 20/53 |
| 2018/0338336 A1 | 11/2018 | Seo et al. | |
| 2019/0104557 A1 | 4/2019 | Fujita | |
| 2019/0327675 A1 | 10/2019 | Takeuchi et al. | |
| 2020/0236499 A1 | 7/2020 | Evans et al. | |
| 2020/0200854 A1 | 8/2020 | Klinkner et al. | |
| 2020/0259908 A1 | 8/2020 | Klinkner et al. | |
| 2020/0404610 A1 | 12/2020 | Crouch et al. | |
| 2021/0068194 A1 | 3/2021 | Han et al. | |
| 2022/0086763 A1 | 3/2022 | Jung | |
| 2022/0201113 A1 | 6/2022 | Peng | |

FOREIGN PATENT DOCUMENTS

| | | |
|---|---|---|
| EP | 3537734 A1 | 9/2019 |
| JP | 5972858 B2 | 8/2016 |
| KR | 100635542 B1 | 10/2006 |
| KR | 20190065755 A | 6/2019 |
| KR | 20190084584 A | 7/2019 |
| KR | 20190110393 A | 9/2019 |
| KR | 102118420 B1 | 6/2020 |
| KR | 20200069532 A | 6/2020 |
| KR | 20200079252 A | 7/2020 |
| WO | 2017086656 A1 | 5/2017 |

OTHER PUBLICATIONS

International Search Report and Written Opinion for International Application No. PCT/KR2021/009170; International Filing Date Jul. 16, 2021; Date of Mailing Oct. 29, 2021; 12 Pages.

* cited by examiner

METHOD FOR MANAGING WIRELESS CONNECTION OF ELECTRONIC DEVICE AND DEVICE THEREFOR

CROSS-REFERENCE TO RELATED APPLICATION

This application is a continuation application, claiming priority under § 365(c), of International Application No. PCT/KR2021/009170, filed on Jul. 16, 2021, which is based on and claims the benefit of Korean patent application number 10-2020-0154930, filed on Nov. 18, 2020, in the Korean Intellectual Property Office and of Korean patent application number 10-2020-0099437, filed on Aug. 7, 2020, in the Korean Intellectual Property Office, the disclosures of which are incorporated by reference herein in their entireties.

TECHNICAL FIELD

Various embodiments disclosed herein relate to a technology of establishing and managing a wireless communication connection of an electronic device.

BACKGROUND ART

As various electronic products are increasingly widespread in recent years, users use a plurality of electronic devices such as a smart watch, an earphone, and a tablet, each of which can be used in connection with a smartphone, in addition to a mobile communication device such as a smartphone. A small-sized electronic device such as an earphone may be often at risk of loss due to user carelessness. A manufacturer or a service provider may provide a service for identifying a location of an electronic device, in case the electronic device is lost.

A location identification service for an electronic device may be implemented in such a manner that when an electronic device, the location of which is required to be identified, broadcasts a signal including identification information to notify an external device/service of its existence, peripheral mobile devices scan and register the signal at a predetermined server together with positioning information, and the predetermined server shares the positioning information with a mother terminal having been registered with the same account as the electronic device.

Technical Problem

As discussed previously, a location identification service for a misplaced electronic device may be implemented in part by sharing a broadcast signal and/or positioning information for the misplaced device to a mother terminal. Unfortunately, in this process, even when the mother terminal is close to the electronic device, based on the positioning information, it may be difficult to control the electronic device while the electronic device maintains a connection with other peripheral terminals. Without the ability to control the misplaced device, the mother terminal is not able to instruct the misplaced device to take any corrective measures, such as, for example only, issuing a beep or other loud sound for easy locating.

Another terminal (e.g., a mother terminal, one or more terminals having been registered with the same group account, or terminals having been identified to have a reliable relationship with each other) capable of interworking with an electronic device while the electronic device maintains a connection with a peripheral device may indirectly control the electronic device by transmitting control information to the electronic device through a predetermined server. However, in this case, even when the terminal is at a close distance where a short-range wireless communication connection with the electronic device is possible, since the terminal transmits the control information via the server, the communication cost and time required to transmit the control information to the electronic device may increase. In addition, when the terminal is not in an environment where network communication with the server is possible, there may be a limitation that the control information cannot be transmitted to the electronic device.

TECHNICAL SOLUTION

Various embodiments herein may provide a channel through which an electronic device may be controlled at least temporarily by another terminal located nearby, even while the electronic device maintains a connection with a peripheral device.

The technical problems to be solved through various embodiments disclosed herein are not limited to the above-mentioned technical problems, and other technical problems not mentioned will be clearly understood by a person skilled in the art to which the disclosure belongs from the following description.

An electronic device according to an embodiment disclosed herein may include a communication module configured to support a wireless communication service by operating at least two channels, a display module, at least one processor operatively connected with the communication module and the display module, and a memory operatively connected with the at least one processor, wherein the memory stores instructions which, when executed, cause the at least one processor to receive a first signal broadcasted by a first external electronic device through the communication module, obtain state information of the first external electronic device, based on the first signal, receive a control request for the first external electronic device from a user, when the control request is input, identify whether the first external electronic device is connected to a second external electronic device through a normal channel, based on the state information, when the first external electronic device is connected to the second external electronic device through the normal channel, connect to the first external electronic device using a reserved channel, when the connection is successful, transmit a control command corresponding to the control request to the first external electronic device through the reserved channel, and when the control request is not input from the user for a designated time after connecting to the first external electronic device over the reserved channel, block the reserved channel connected to the first external electronic device.

An electronic device according to an embodiment disclosed herein may include a wireless communication circuit, at least one processor operatively connected with the wireless communication circuit, and a memory operatively connected with the at least one processor, wherein the memory stores instructions which, when executed, cause the at least one processor to, in response to receiving a connection request from a first external device, connect to the first external device by using a normal channel, change state information of the electronic device to indicate that the normal channel is connected to an external device, and control the wireless communication circuit to broadcast a first signal including the changed state information.

An operation method of an electronic device according to an embodiment disclosed herein may include: receiving a first signal broadcasted by a first external electronic device; identifying state information of the first external electronic device, based on the first signal; receiving a control request for the first external electronic device from a user; when the control request is input, identifying whether the first external electronic device is connected to a second external electronic device through a normal channel, based on the state information; when the first external electronic device is connected to the second external electronic device through the normal channel, connecting to the first external electronic device using a reserved channel; when the connection is successful, transmitting a control command corresponding to the control request to the first external electronic device through the reserved channel; and when the control request is not input from the user for a designated time after connecting to the first external electronic device over the reserved channel, blocking the reserved channel connected to the first external electronic device.

Advantageous Effects of Invention

According to various embodiments disclosed herein, it is possible to improve the efficiency of network communication by providing a channel through which an electronic device may be controlled at least temporarily by another terminal located nearby, even while the electronic device maintains a connection with a peripheral device. In addition, it is possible to prevent unnecessary communication from occurring by allowing peripheral terminals having received a signal broadcasted by an electronic device to determine whether to update location information on the electronic device according to a channel connection state of the electronic device.

In addition, various effects identified directly or indirectly through this disclosure may be provided.

BRIEF DESCRIPTION OF DRAWINGS

In relation to the description of drawings, the same or similar reference numerals may be used for the same or similar elements.

MODE FOR CARRYING OUT THE INVENTION

Hereinafter, various embodiments disclosed herein will be described with reference to the accompanying drawings. This is not intended to limit various embodiments of the disclosure to specific forms, and should be understood to include various modifications, equivalents, and/or alternatives of the disclosure.

Figure 1:
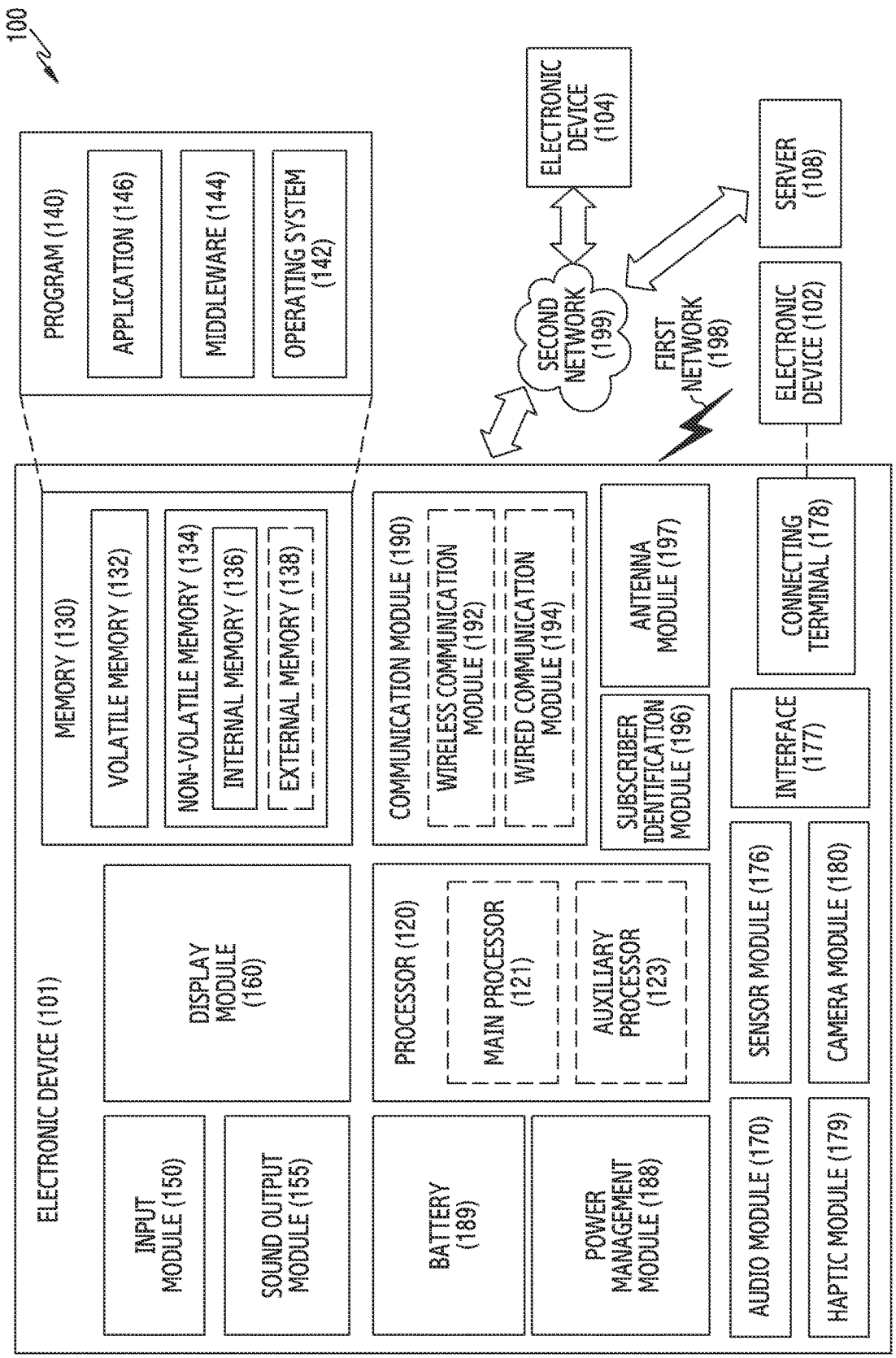
FIG. 1 is a block diagram of an electronic device in a network environment according to an embodiment.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
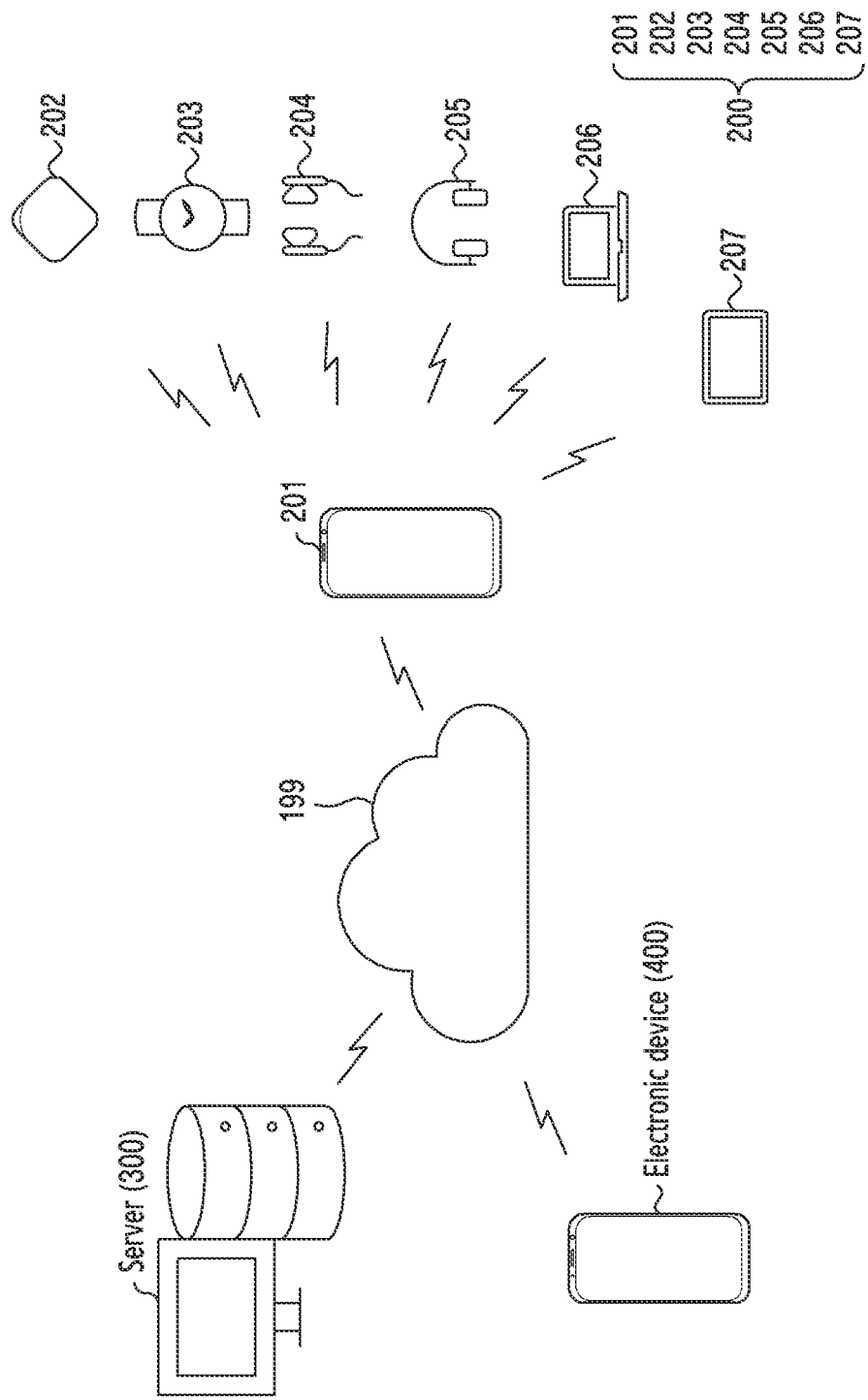
FIG. 2 illustrates a system for identifying a location of a user device according to an embodiment.

FIG. 2 illustrates a system for identifying a location of a user device according to an embodiment.

Referring to FIG. 2, a system according to an embodiment may include user devices 200, a server 300, and an electronic device 400. At least one of the user devices 200 and the electronic device 400 may be connected to the server 300 via a second network 199 (e.g., Wi-Fi or a cellular network).

In an embodiment, the user devices 200 may include a plurality of devices. For example, a certain user may further own at least one of a second device 202, a third device 203, a fourth device 204, a fifth device 205, a sixth device 206, or a seventh device 207, in addition to a first device 201 which is mainly used. The first device 201 may be, for example, a mobile communication device such as a smartphone. The second device 202 is a tag device having a small size which is not easily found, and may be manufactured in a form of a small object such as a key chain or a button, or in a form mountable to another electronic device or object. The third device 203 may be a wearable device such as a smart watch. The fourth device 204 may be wireless earphones such as earbuds. The fifth device 205 may be a Bluetooth headphone or headset. The sixth device 206 may be a notebook. The seventh device 207 may be a tablet. In addition to the example illustrated in FIG. 2, a user may use another appropriate device by interworking therewith in addition to the first device 201. For example, a key fob, a wallet, a backpack, a dog or cat recognition device, a car, a bicycle, an identification card, a briefcase, an umbrella, and/or other devices (gear) may also be a device capable of interworking with the first device 201 if the same satisfy a communication function described in various embodiments of this document. The first device 201 may track a location of a device which can be interworked when necessary (for example, when the device is lost). In addition, in some embodiments, a user may use two or more of the same kind of devices. For example, the user may use a plurality of smartphones (e.g., the first device 201) by interworking with each other. In addition, the user may use two or more tablets (e.g., the seventh device 207) by interworking with the first device 201.

In an embodiment, the user devices 200 may be connected to each other by using one or a plurality of communication protocols. For example, the first device 201 may be connected with at least one of the second device 202, the third device 203, the fourth device 204, the fifth device 205, the sixth device 206, or the seventh device 207 via a short-range network. For example, a network (e.g., a short-range network) for establishing a connection between the user devices 200 may be appropriately selected. For example, along with or instead of Bluetooth, Bluetooth low energy (BLE), Wi-Fi direct, near field communication (NFC), ultra-wide band (UWB) communication, or infrared communication may be used to establish a connection between the user devices 200. In addition, in an embodiment, the user devices 200 may establish a connection by using a mesh network (e.g., Zigbee or Z-Wave) as short-range wireless communication.

In an embodiment, the user devices 200 may be connected with one another in various methods according to device information (e.g., a device configuration element). For example, when at least one of the user devices 200 is an IP-based (IP address) device, the device may establish a connection with the second network 199 by using a service set identifier (SSID), and, when the device is not the IP-based device (e.g., BLE, Zigbee, or Z-wave), the device may establish a connection with the second network 199 by using a user device (e.g., the first device 201) or a hub device (not shown).

In an embodiment, at least one of the user devices 200 may broadcast an advertising packet to provide a finding function when the device is lost. For example, when it is determined that the second device is lost, the second device 202 may broadcast a variety of information including identification information thereof (the second device 202) by using a packet. The packet may be broadcasted to be received by one or a plurality of electronic devices located within a predetermined communicable distance, in addition to the second device 202. In various embodiments of the disclosure, a packet or an advertising packet may be understood as a signal, a message, or a beacon capable of recognizing that a device is lost.

In an embodiment, at least one of the user devices 200 may determine whether itself is lost, according to various criteria. For example, when a first time (e.g., 15 minutes) elapses from the last time point at which the second device 202 is connected with the first device 201 which is a mother terminal or a main terminal, the second device 202 may determine that the second device enters an offline state in which the connection with the first device 201 is broken. For example, when a second time (e.g., 24 hours) further elapses after entering the offline state, the second device 202 may determine that itself is lost. According to various embodiments, in determining whether the second device is lost, the second device 202 may additionally consider a remaining capacity of a battery besides a time. In this case, the remaining capacity of the battery may be a remaining capacity of the battery of the second device 202, and the time may be the first time (e.g., 15 minutes) and the second time (e.g., 24 hours). The first time, the second time, and/or the remaining capacity of the battery may be applied as various loss determining criteria according to a user configuration or criteria of a manufacturer.

In various embodiments, descriptions of the electronic device 101 may be appropriately applied to the user devices 200 with reference to FIG. 1. For example, when the first device 201 of the user is a smartphone, the first device 201 and the electronic device 101 may be the same device. In addition, for example, when the fourth device 204 of the user is earbuds without a display, descriptions of the electronic device 101 except for the description of the display module 160 may be appropriately applied to the fourth device 204.

In an embodiment, the server 300 may correspond to the server 108 of FIG. 1. When at least one of the user devices 202, 203, 204, 205, 206, and 207 other than the first device 201 is lost from among the user devices 200, the server 300 may provide a function of identifying a location of the at least one lost device. In various embodiments disclosed herein, for convenience of explanation, an example in which, when the second device 202 is lost from among the user devices 200, the first device 201 identifies a location of the lost second device 202 will be described.

In an embodiment, the electronic device 400 may be a device of another user who is different from an owner of the second device 202. The electronic device 400 may be in the proximity of the second device 202 and may directly or indirectly acquire an advertising packet broadcasted from the second device 202. The electronic device 400 may include a short-range communication circuit for receiving a signal broadcasted by the second device 202 by using a short-range communication technique (e.g., BLE). In addition, the electronic device 400 may include a location measurement circuit (e.g., a GPS circuit) for measuring its own location. In addition, the electronic device 400 may include a long-range communication circuit (e.g., a communication circuit supporting a cellular network and/or a Wi-Fi network) for transmitting information on the second device 202 and its own location to the server 300.

In an embodiment, the electronic device 400 may be the same kind of device (e.g., a smartphone) as the first device 201. A part or entirety of descriptions of the electronic device 101 described with reference to FIG. 1 may be applied to the electronic device 400. In addition, descriptions of a configuration or function of the first device 201 in various embodiment of this documents may be applied to the electronic device 400, but may not be considered as limiting. The electronic device 400 may be a certain electronic device which supports the above-described communication function.

Figure 3:
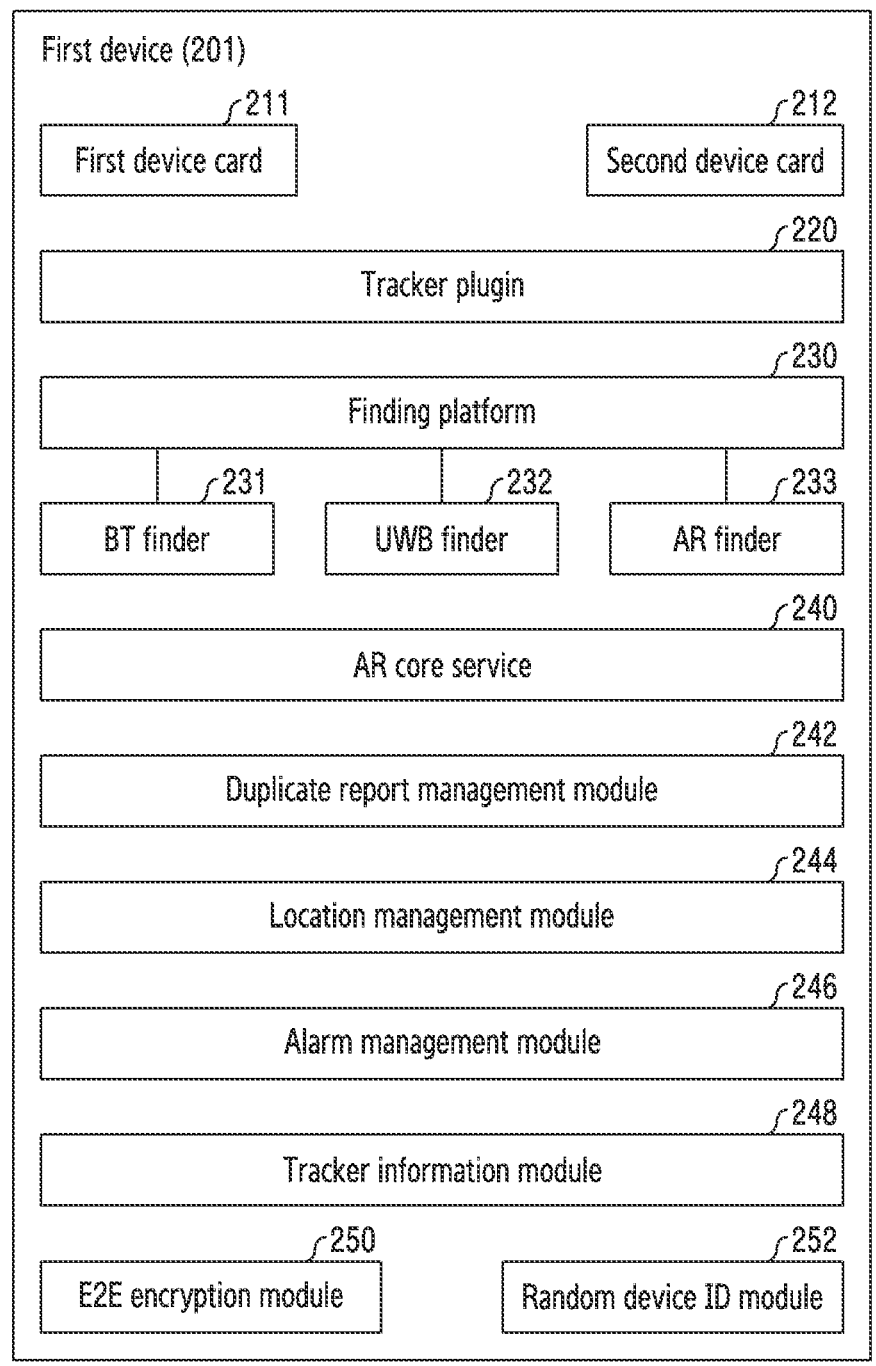
FIG. 3 illustrates modules related to various functions of an electronic device according to an embodiment.

FIG. 3 illustrates modules related to various functions of an electronic device according to an embodiment.

Various functions described in FIG. 3 may be understood as functions which are supported by the first device 201 in terms of finding the second device 202. In addition, various functions described in FIG. 3 may be understood as functions which are supported by the electronic device 400 in terms of processing an advertising packet obtained from the second device 202. As described above, the first device 201 and the electronic device 400 may be only distinguished according to whether the device is a device of a user which seeks the second device 202 or a device of a user which provides help in finding the second device 202. The functions described in FIG. 3 may be provided in both the first device 201 and the electronic device 400. Hereinafter, descriptions will be made with reference to the first device 201.

The functions or operations described with reference to FIG. 3 may be understood as functions performed by a processor of the first device 201. The processor may execute instructions stored in a memory to implement a software module shown in FIG. 3, and may control hardware (e.g., the communication module 190 of FIG. 1) related to the functions. The term "module" as used in the description of FIG. 3, may include various circuitry (e.g., processing circuitry) and/or executable program instructions.

In an embodiment, the first device 201 may manage at least one device card. For example, a first device card 211 regarding the first device 201 may be registered at the first device 201. In addition, a second device card 212 regarding the second device 202 which has a history of having interworking with the first device 201 may be registered at the first device 201. The device card (e.g., the first device card 211 and the second device card 212) may include information such as a name and/or identification information of a device, a state of the device, battery information of the device, a location history of the device and/or a current location of the device, or a message related to the device. In an embodiment, the information included in the first device card 211 and/or the second device card 212 may be configured and/or changed by a user. For example, the user of the first device 201 and/or the second device 202 may configure a name related to the first device 201 and/or the second device 202, a device type (e.g., type), or policy information.

In an embodiment, the first device 201 and the second device 202 may share the same user account. In this case, the first device card 211 and the second device card 212 may be registered with respect to the same user account. For example, when an input requesting identification of a location of a device interworking with the first device 201 is received by the user of the first device 201, the first device 201 may provide a user interface (UI) showing information on the first device card 211 and the second device card 212, the information being stored in the memory, through a display (e.g., the display module 160 of FIG. 1). An example UI will be described below with reference to FIGS. 7A and 7B.

In an embodiment, a user account of the first device 201 may be different from a user account of the second device 202. In this case, when it is identified that the first device 201 and the second device 202 having different user accounts can trust each other, the first device card 211 and the second device card 212 may be registered with respect to the same user account. For example, when it is identified that a first user of the first device 201 and a second user of the second device 202 are family members, information on the second device 202 may be identified through a first user account of the first user of the first device 201. Hereinafter, descriptions will be made with reference to the same user for convenience, but various embodiments may be applied when users of the first device 201 and the second device 202 are different.

In an embodiment, a tracker plugin 220 may be understood as a module for registering a user device. For example, the first device 201 may drive the tracker plugin 220. The tracker plugin 220 may provide an easy user configuration (easy setup pop), or provide a registration using a QR code (e.g., QR triggering) or manual registration (manual onboarding) function. For example, a user may photograph a QR code attached to one surface of the second device 202 or a product case by using a camera (e.g., the camera module 180 of FIG. 1) mounted in the first device 201, so as to register the second device 202 at the server 300 by associating the same with the user account.

In an embodiment, a finding platform 230 may perform a function of finding an electronic device which is lost. The finding platform 230 may control hardware to effectively search for and discover a lost electronic device according to a distance to the electronic device. For example, the finding platform 230 may operate together with a BT (Bluetooth) finder 231, a UWB (ultra wide band) finder 232, and/or an AR (augmented reality) finder 233. For example, the BT finder 231 may control a Bluetooth communication circuit, the UWB finder 232 may control a UWB communication circuit, and the AR finder 233 may control a display.

In an embodiment, the BT finder 231 may operate when a distance between the first device 210 and the second device 202 is within a first distance (e.g., about 100 m). The finding platform 230 may control the BT finder 231, and, when the distance between the first device 201 and the second device 202 is within the first distance, the finding platform may receive a packet from the second device 202 by using a short-range communication circuit supporting Bluetooth communication and/or BLE communication, or may establish a short-range communication connection with the second device 202.

In an embodiment, the UWB finder 232 may operate when the distance between the first device 201 and the second device 202 is within a second distance (e.g., about 50 m) which is shorter than the first distance. The finding platform 230 may control the UWB finder 232 to activate the UWB communication circuit which is connected with a plurality of UWB antennas to receive a signal of a UWB channel used for positioning. The finding platform 230 may receive a UWB signal received from the second device 202 by using the UWB communication circuit, and estimate a location of the second device 202, based on an angle of arrival and/or an arrival time of a signal received by each of the plurality of UWB antennas.

In an embodiment, when the second device 202 is within a short distance, the AR finder 233 may visually aid a user to find the second device 202 by implementing augmented reality (AR) on the display. Herein, the short distance may be substantially the same as the second distance or may be within a third distance which is shorter than the second distance. The finding platform 230 may output image data obtained through a camera to the display, and control the AR finder 233 to display the location of the second device 202, as identified through the UWB finder 232, on a screen output to the display. In addition, when the first device 201 does not effectively receive the UWB signal from the second device 202 (e.g., when a reception sensitivity is less than or equal to a threshold value), the AR finder 233 may guide the first device 201 through the display to place the first device at a posture (angle) appropriate for receiving the UWB signal.

In an embodiment, when the AR finder 233 is activated for operation, an AR core service 240 may also be activated. The AR core service 240 may control the first device 201 to access a portrait/object recognition database which is stored in the memory, and/or an AR service providing server, in order to strengthen the augmented reality environment.

In an embodiment, the BT finder 231, the UWB finder 232, and/or the AR finder 233 included in the finding platform 230 may operate simultaneously or may selectively operate according to a distance to the second device 202. For example, when the distance between the first device 201 and the second device 202 is within the second distance (e.g., about 50 m), the BT finder 231 and the UWB finder 232 may operate simultaneously, or the UWB finder 232 may selectively operate.

In an embodiment, when the first device 201 receives an advertising packet from a certain lost device (e.g., the second device 202), a duplicate report management module 242 may execute an operation of rebroadcasting the received advertising packet or reporting to the server. The duplicate report management module 242 may provide a function for preventing duplicate reporting of information on a random lost device (e.g., the second device 202). For example, the duplicate report management module 242 may execute an operation of reporting to the server/rebroadcasting when the advertising packet received from the second device 202 satisfies a predetermined condition. The operations of reporting to the server and/or rebroadcasting may not be executed by the duplicate report management module 242 when the advertising packet received from the second device 202 does not satisfy the predetermined condition. For example, the duplicate report management module 242 may operate when the first device 201 performs the role of the electronic device 400 (for example, the role of a device of a user, which provides help in finding a certain lost device (e.g., the second device 202)).

In an embodiment, a location management module 244 may manage a current location of the second device 202 and/or a history of location changes, as obtained from the server 300. The location management module 244 may control a location measurement circuit, such as a GPS included in the first device 201, to identify and/or manage a location of the first device 201.

In an embodiment, an alarm management module 246 may manage alarm-related information of the second device 202. The alarm-related information may include an alarm control state obtained from the second device 202 and/or an alarm-related command regarding the second device 202 as obtained from the server 300. For example, when an alarm-related characteristic value is obtained from the second device 202, the alarm management module 246 may identify and manage an alarm control state of the second device 202, based on the obtained alarm-related characteristic value. In another example, when an alarm command regarding the second device 202 is obtained from the server 300, the alarm management module 246 may identify and manage an alarm control state of the second device 202, based on data included in the alarm command.

In an embodiment, a tracker information module 248 may manage a type of the second device 202 and/or identification information of the second device 202. The tracker information module 248 may operate when the first device 201 performs the role of the electronic device 400. For example, the tracker information module 248 may store and/or manage information including a device type (e.g., a smart watch, an earphone, a headphone, or a tablet) of the second device 202, a communication type (e.g., whether BLE is supported, whether Bluetooth is supported, whether a cellular network is supported, or whether UWB communication is supported), and/or identification information (e.g., a device unique ID, a network identification ID, or a user-defined ID).

In an embodiment, an E2E encryption module 250 may perform end-to-end encryption. The E2E encryption module 250 may operate when the first device 201 performs the role of the electronic device 400. For example, when the electronic device 400 transmits a message including identification information of a lost device and location information of the electronic device 400 to the server 300 in response to an advertising packet being received from a certain lost device (e.g., the second device 202) by the electronic device 400, the E2E encryption module 250 may apply an encryption algorithm to the message. When the E2E encryption module 250 encrypts the message by using an encryption key related to the lost device, a device having a decryption key corresponding to the encryption key of the lost device may obtain location information of the lost device. For example, the electronic device 400 may encrypt a message including identification information of the second device 202 and location information of the electronic device 400, with a public key of the second device 202, and transmit the encrypted message to the server 300. The first device 201 may obtain the encrypted information on the lost second device 202 from the server 300, and then decrypt the information with a private key of the second device 202 to identify the location of the second device 202 (=location of the electronic device 400). For example, the first device 201 may secure the private key of the second device 202 in the process of registering the second device 202 for the user account, the process of registering at the server 300, or the process of pairing with the second device 202.

In an embodiment, a random device ID module 252 may change an identification ID of a device to a random ID by using a predetermined algorithm. The random device ID module 252 may operate when the first device 201 performs the role of the electronic device 400. For example, when the electronic device 400 receives an advertising packet from the second device 202, the electronic device may change an identification ID of the second device 202 to a random ID and transmit a message to the server 300. The first device 201 may identify the ID of the second device 202 from the random ID by using a predetermined algorithm.

Figure 4:
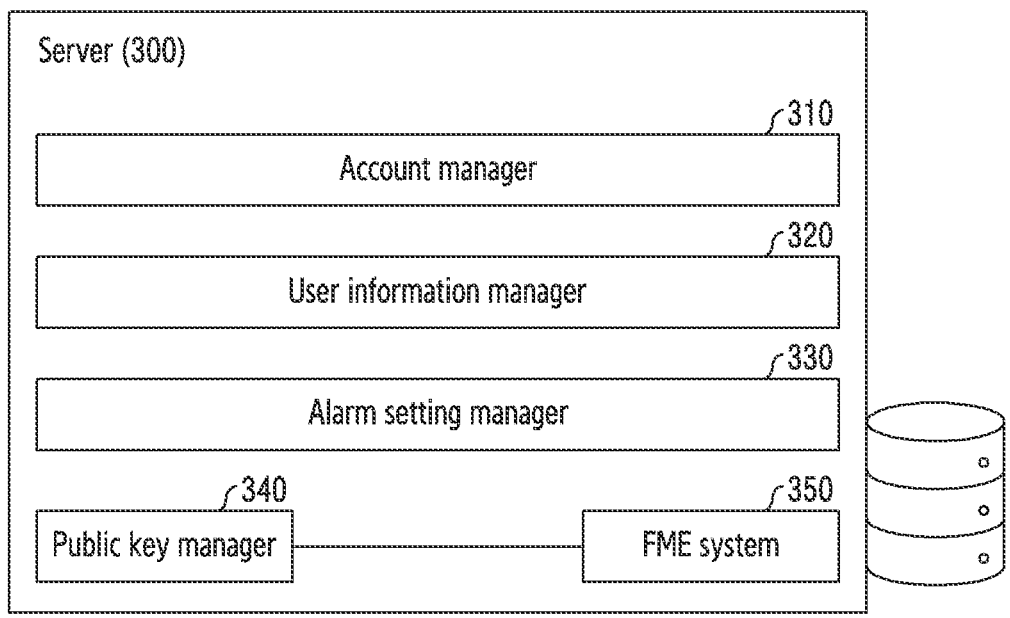
FIG. 4 illustrates modules related to various functions of a server according to an embodiment.

FIG. 4 illustrates modules related to various functions of a server according to an embodiment.

Referring to FIG. 4, the server 300 may include an account manager 310, a user information manager 320, an alarm setting manager 330, a public key manager 340, and a find my everything (FME) system 350, each of which may include various circuitry (e.g., processing circuitry) and/or executable program instructions. The elements of the server 300 may be classified from the viewpoint of functions in order to implement various embodiments. The server 300 may be implemented through a plurality of hardware devices (e.g., a plurality of processors and a storage device for a server). The server 300 may be understood as a plurality of servers. For example, the server 300 may include a first server for providing an electronic device finding service in a first country, and a second server for providing an electronic device finding service in a second country.

In an embodiment, the server 300 may include the account manager 310. The account manager 310 may manage a user account registered at the server 300 and/or at least one device connected with the user account. For example, when the first device 201, the second device 202, and the third device 203 are registered with a first user account, since the first device 201 and the second device 202 are connected to the same first user account, the account manager 310 may allow the first device 201 to access information on the second device 202 even when a request related to the second device 202 is received from the first device 201.

In an embodiment, the server 300 may include the user information manager 320. The user information manager 320 may manage registration, addition, deletion, and/or modification of user information associated with the user account.

In an embodiment, the server 300 may include the alarm setting manager 330. The alarm setting manager 330 may determine whether it is necessary to generate an alarm of a lost device (e.g., the second device 202). The server 300 may determine that the second device 202 is lost, based on a first signal received from the electronic device 400. The first signal may include identification information and location information of the second device 202. The alarm setting manager 330 may determine to generate an alarm only when a designated condition regarding the second device 202 which is lost is satisfied. For example, when location information is continuously received from the same electronic device 400 in a situation where a designated time has elapsed after an alarm is generated in the second device 202, or when location information is received from the same electronic device 400 in a situation where a change in the location of the second device 202 is detected, the alarm setting manager 330 may determine that it is necessary to generate an alarm in the second device 202. According to various embodiments, even when location information related to the second device 202 is periodically received from a plurality of electronic devices 400, the alarm setting manager 330 may determine that an alarm in the second device 202 is required to be generated, and may generate an alarm command to be configured for the second device 202, and forward the alarm command to at least one electronic device 400. In addition, the alarm setting manager 330 may manage alarm-related data which includes a time when an alarm is generated in the second device 202, the number of times the alarm is generated, and/or a location.

In an embodiment, the public key manager 340 may manage public keys of devices registered at the server 300. The public key may be managed in the unit of a user account, or may be managed in the unit of a device. For example, one public key may be configured for one user account. In another example, when five devices are connected with the same user account, five different public keys may be allocated to the five devices, respectively.

In an embodiment, the FME system 350 may perform processing for providing a lost device finding service. For example, when a request for a public key regarding the lost second device 202 is received from the electronic device 400, the FME system 350 may obtain the public key regarding the second device 202 from the public key manager 340, and provide the obtained public key to the electronic device 400. For example, the FME system 350 may identify the user account to which the second device 202 is registered through the account manager 310. The FME system 350 may identify the user account and/or location information corresponding to the second device 202 through the user information manager 320, and provide the same to the first device 201 or the electronic device 400.

Figure 5:
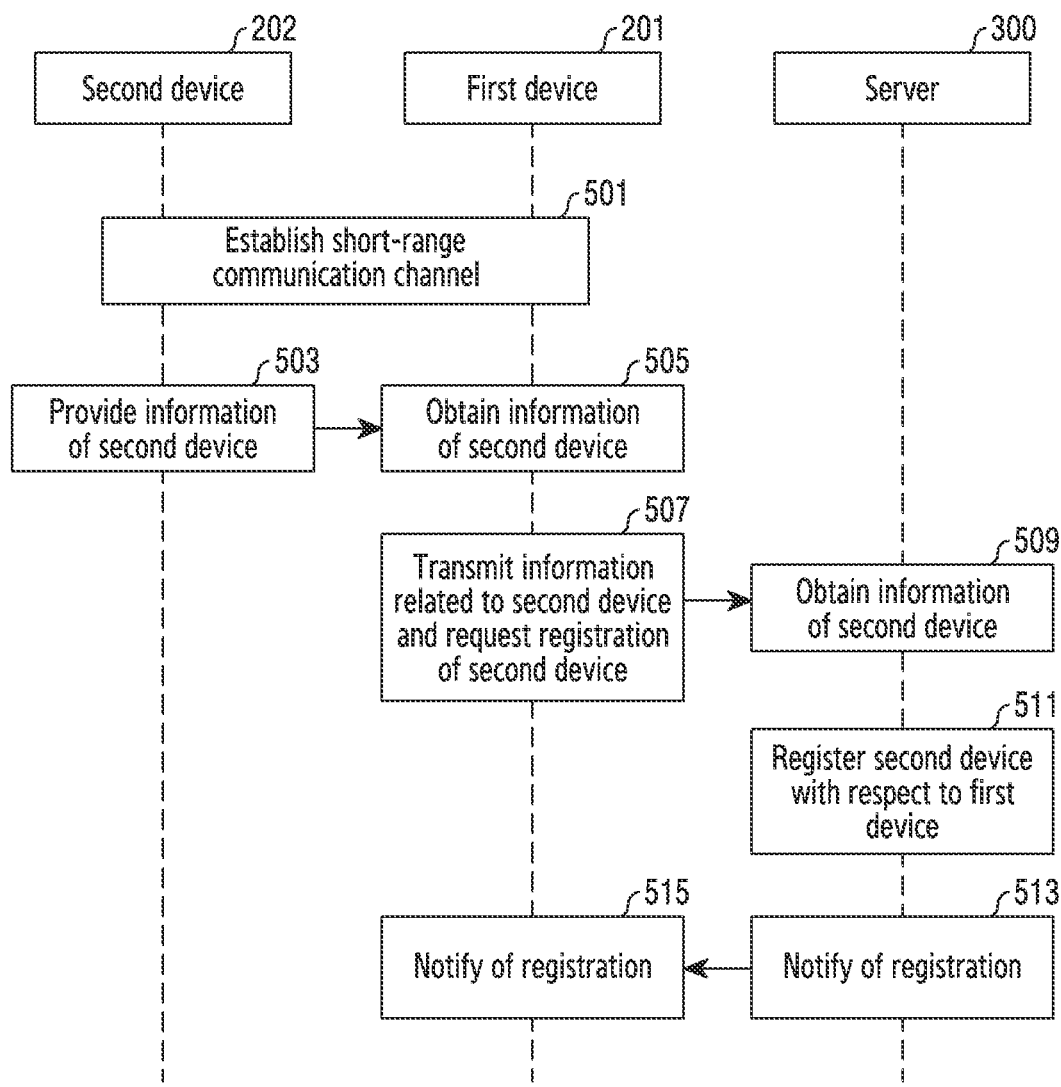
FIG. 5 is a signal flow diagram illustrating a process in which a first device registers a second device at a server according to an embodiment.

FIG. 5 is a signal flow diagram illustrating a process in which a first device registers a second device at a server according to an embodiment.

Referring to FIG. 5, in operation 501, the first device 201 may establish a short-range communication channel with the second device 202. For example, the short-range communication channel may be a device-to-device connection such as Bluetooth or Wi-Fi direct, but is not limited thereto.

According to an embodiment, in operation 503, the second device 202 may provide information of the second device 202 to the first device 201 through the short-range communication channel. The information of the second device 202 may include, for example, a type (e.g., a tag, a smart watch, or a tablet) of the second device 202, unique identification information (e.g., a device ID), a manufacturer of the second device 202, hardware information (e.g., processor performance, a memory capacity, and/or a battery capacity) of the second device 202, software information (e.g., a type and a version of an operating system, an installed application, and/or information on whether a device finding service is supported) of the second device 202, and/or information regarding communication performance (e.g., whether Bluetooth is supported, whether BLE is supported, whether UWB is supported, whether cellular is supported, whether Wi-Fi is supported, whether NFC is supported, and/or whether MST is supported).

According to an embodiment, in operation 505, the first device 201 may obtain the information of the second device 202. The first device 201 may store the obtained information of the second device 202 in a memory (e.g., the memory 130 of FIG. 1) of the first device 201.

According to an embodiment, in operation 507, the first device 201 may transmit the information on the second device 202 to the server 300, and request the server to register the second device 202. For example, the first device 201 may transmit a message in a designated format to the server 300. The message in the designated format may include information of the first device 201, user information of the first device 201, a registration request of the second device 202, and/or information of the second device 202. For example, when the first device 201 is registered at a first user account registered at the server 300, the first device 201 may transmit the message to the server 300, so as to request the server to register the second device 202 at the first user account. In another example, when the first device 201 is registered at the first user account registered at the server 300 and the second device 202 is registered at a second user account registered at the server 300, the first device 201 may transmit the message to the server 300, so as to request the server to register the second device at a third user account (e.g., a group account) including the first user account and the second user account, and/or request the server to delete information of the second device 202 registered at the second user account, and register the second device 202 at the first user account.

According to an embodiment, in operation 509, the server 300 may obtain the information on the second device 202 from the first device 201. The server 300 may be connected with the first device 201 through a predetermined network (e.g., a cellular network or a Wi-Fi network). The server 300 may obtain the information of the second device 202 transmitted from the first device 201 through the predetermined network.

According to an embodiment, in operation 511, the server 300 may register the second device 202 with respect to the first device 201. For example, the account manager 310 of the server 300 may also register the second device 202 with respect to the first user account corresponding to the first device 201 by using the information obtained from the first device 201.

According to an embodiment, in operation 513, the server 300 may transmit, to the first device 201, a notification indicating that the second device 202 is registered. In operation 515, the first device 201 may receive a registration notification from the server 300.

In an embodiment, operations 501 to 515 may be referred to as a registration procedure or an onboarding procedure of the second device 202. In addition, in an embodiment, the registration procedure or the onboarding procedure may include a procedure for storing identification information (ID) of the second device 202 (e.g., a tracker) in the server 300.

When a designated time has elapsed after the second device 202 is disconnected from the first device 201, the second device may recognize that the second device itself is lost, and may broadcast an advertising packet including its own identification information. These operations will be described below.

Figure 6:
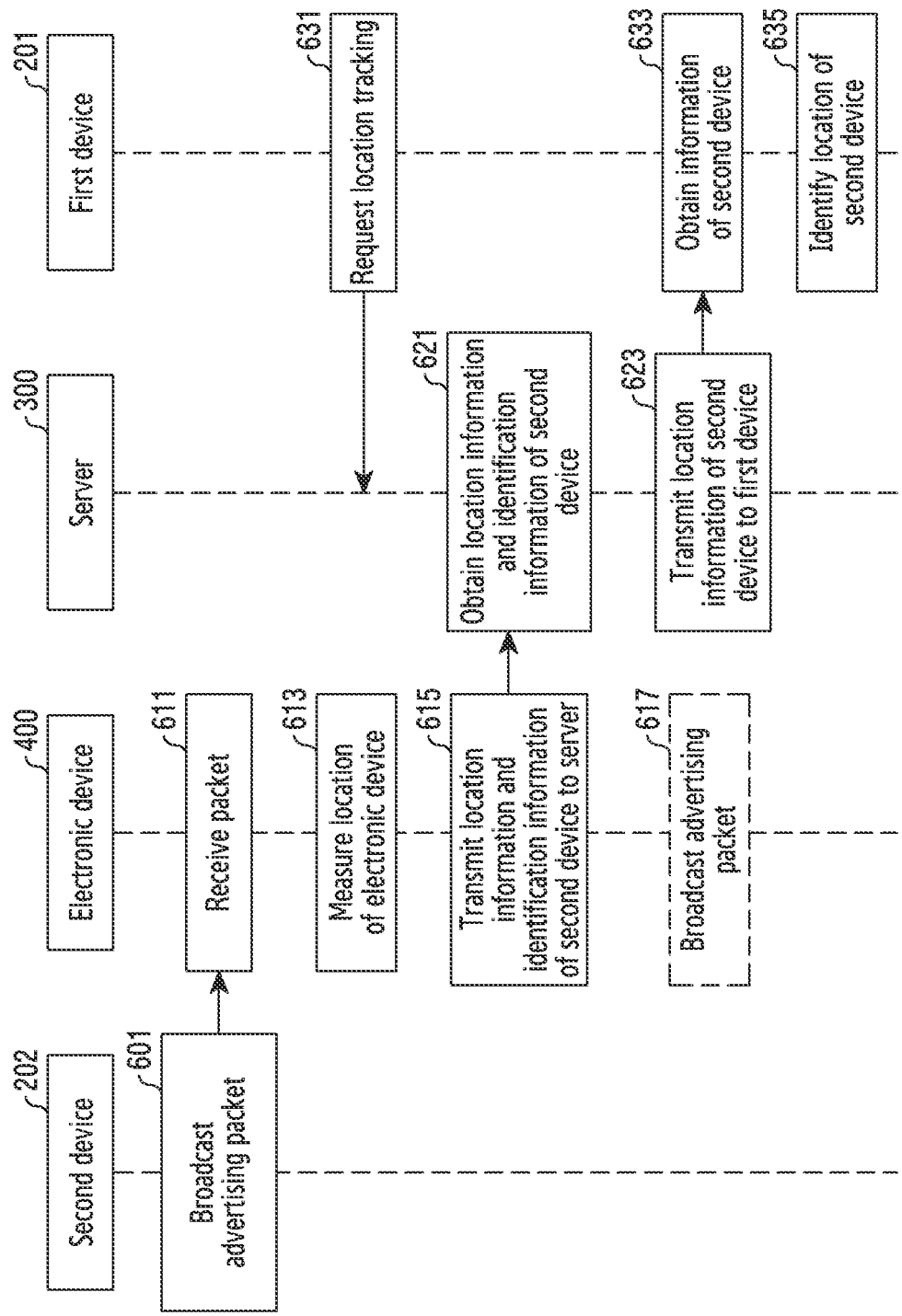
FIG. 6 is a signal flow diagram illustrating a process of tracking a current location of a lost device in a finding system according to an embodiment.

FIG. 6 is a signal flow diagram illustrating a process of tracking a current location of a second device in a finding system according to an embodiment. For reference, FIG. 6 illustrates a situation in which the first device 201 and the second device 202 in the system of FIG. 2 are user devices sharing the same user account, and the second device 202 between them is lost. The electronic device 400 may be a certain device which has no association with a user of the first device 201, and may be understood as a device located at a distance at which a packet broadcasted from the second device 202 may be received.

According to an embodiment, in operation 601, the second device 202 may broadcast an advertising packet by using a designated communication protocol. The designated communication protocol may correspond to a type of low-power short-range communication protocol to minimize battery consumption. For example, the designated communication protocol may be BLE.

In an embodiment, when the second device 202 detects itself as lost, the second device 202 may broadcast an advertising packet. As described above, various conditions for determining that the second device 202 is lost may be configured. However, in another embodiment, the second device 202 may broadcast an advertising packet regardless of whether the second device is detected as lost. For example, the second device 202 may repeatedly broadcast the advertising packet for a predetermined time (e.g., 15 minutes) every predetermined period (e.g., 1 hour). In another example, the second device 202 may repeatedly broadcast the advertising packet for a predetermined time every a designated time (e.g., a user configuration time).

According to an embodiment, in operation 611, the electronic device 400 may receive an advertising packet broadcasted by an external device. For convenience of explanation, it is assumed that the advertising packet broadcasted by the second device 202 is received.

In an embodiment, the electronic device 400 may include various communication circuits. For example, the electronic device may include a first wireless communication circuit which supports short-range communication to receive an advertising packet. In addition, the electronic device may include a second wireless communication circuit which supports long-range communication (e.g., cellular communication) to communicate with the server 300. In addition, the electronic device 400 may include a location measurement circuit (e.g., a GPS) to measure its own location.

The location measurement circuit may include a positioning system using a base station or an access point (AP) of Wi-Fi, or a positioning system using an NFC beacon, in addition to a positioning system using satellite navigation such as a GPS system.

In an embodiment, since the advertising packet broadcasted by the second device 202 uses a designated short-range communication protocol, receiving the advertising packet may refer to existence of the second device 202 and the electronic device 400 within a communication distance which is allowed by the short-range communication protocol. For example, when the electronic device 400 receives an advertising packet through BLE, it may be estimated that the electronic device 400 is located within about 100 m from the second device 202. Accordingly, the location of the electronic device 400 may be regarded as being the same as the location of the second device 202 from the macroscopic viewpoint.

According to an embodiment, in operation 613, the electronic device 400 may measure a location of the electronic device 400 by using the location measurement circuit. The electronic device 400 may identify the location (e.g., latitude and/or longitude coordinates) of the electronic device 400, based on a result of the measurement.

For example, the electronic device 400 may control the location measurement circuit to receive GPS signals from external sources (e.g., three or more GPS satellites). The electronic device 400 may identify distance information from the electronic device 400 to the satellites which have transmitted the GPS signals, based on time information included in the respective GPS signals received from the external sources. For example, the electronic device 400 may identify real-time location information of the electronic device 400, from distance information corresponding to each of the satellites which have transmitted the GPS signals, based on a triangulation technique.

According to an embodiment, in operation 615, the electronic device 400 may transmit the measured location information and identification information of the second device 202 to the server 300. For example, the electronic device 400 may transmit a message including the location information and the identification information (e.g., a unique ID and/or a serial number) of the second device 202 to the server 300 by using the above-described second wireless communication circuit. The electronic device 400 may specify that the location information included in the message indicates location information of the electronic device 400, but may not specify a subject of the location information and may simply include only the location information.

According to an embodiment, in operation 617, the electronic device 400 may broadcast an advertising packet after transmitting the message to the server 300. For example, when the advertising packet obtained by the electronic device 400 from the second device 202 may be referred to as a first packet, and the advertising packet rebroadcasted by the electronic device 400 may be referred to as a second packet, the second packet may be substantially the same as the first packet or may include less content (data). For example, at least some fields among a plurality of fields included in the format of the first packet may be omitted from the format of the second packet.

In various embodiments, the electronic device 400 may broadcast the advertising packet before transmitting the message to the server 300 or substantially at the same time as transmitting the message. In addition, operation 617 may just not be performed.

According to an embodiment, in operation 621, the server 300 may obtain the message including the location information and the identification information of the second device 202 from the electronic device 400. When there is a request for tracking a location of the second device 202 from the first device 201 (e.g., operation 631) before and/or after the message is obtained, the server 300 may transmit location information of an external device (e.g., the second device 202) to the first device 201 in operation 623. For example, in operation 631, the first device 201 may transmit a request for tracking the location (or identifying the location) of the second device 202 to the server 300, and the server 300 may transmit information on the identified location of the second device 202 to the first device 201 in response to the request received from the first device 201. For example, the server 300 may transmit information on the most recently identified location of the second device 202 to the first device 201.

According to an embodiment, in operation 633, the first device 201 may obtain the location information of the second device 202 from the server 300. In operation 635, the first device 201 may identify the location of the second device 202, based on the information obtained from the server 300. Operations 631, 633, and/or 635 may be implemented via an application mounted in the first device 201 to provide a location identification service. This will be described below with reference to FIGS. 7A and 7B.

According to an embodiment, when the server 300 obtains the location information and the identification information of the second device 202 from the electronic device 400 in operation 621, the server 300 may determine whether a location tracking request (e.g., operation 631) has been received from the first device 201 having registered the second device 202 at the server 300 with the first user account, or from another device having the first user account. For example, when the location tracking request (e.g., operation 631) is not received from the first device 201, the server 300 may not perform operation 623. According to an embodiment, although not shown, the server 300 may transmit a response message to the electronic device 400, based on whether the location tracking request (e.g., operation 631) is received from the first device 201. For example, when the location tracking request (e.g., operation 631) is received from the first device 201, the server 300 may transmit, to the electronic device 400, a response message informing that the location information and the identification information of the second device 202 are transmitted to the first device 201. In another example, when the location tracking request (e.g., operation 631) is not received from the first device 201, the server 300 may request the electronic device 400 not to transmit the location information and the identification information of the second device 202 for a designated time. According to an embodiment, the electronic device 400 may perform the operation (e.g., operation 617) of broadcasting the advertising packet, based on the response from the server 300.

Figures 7A, 7B:
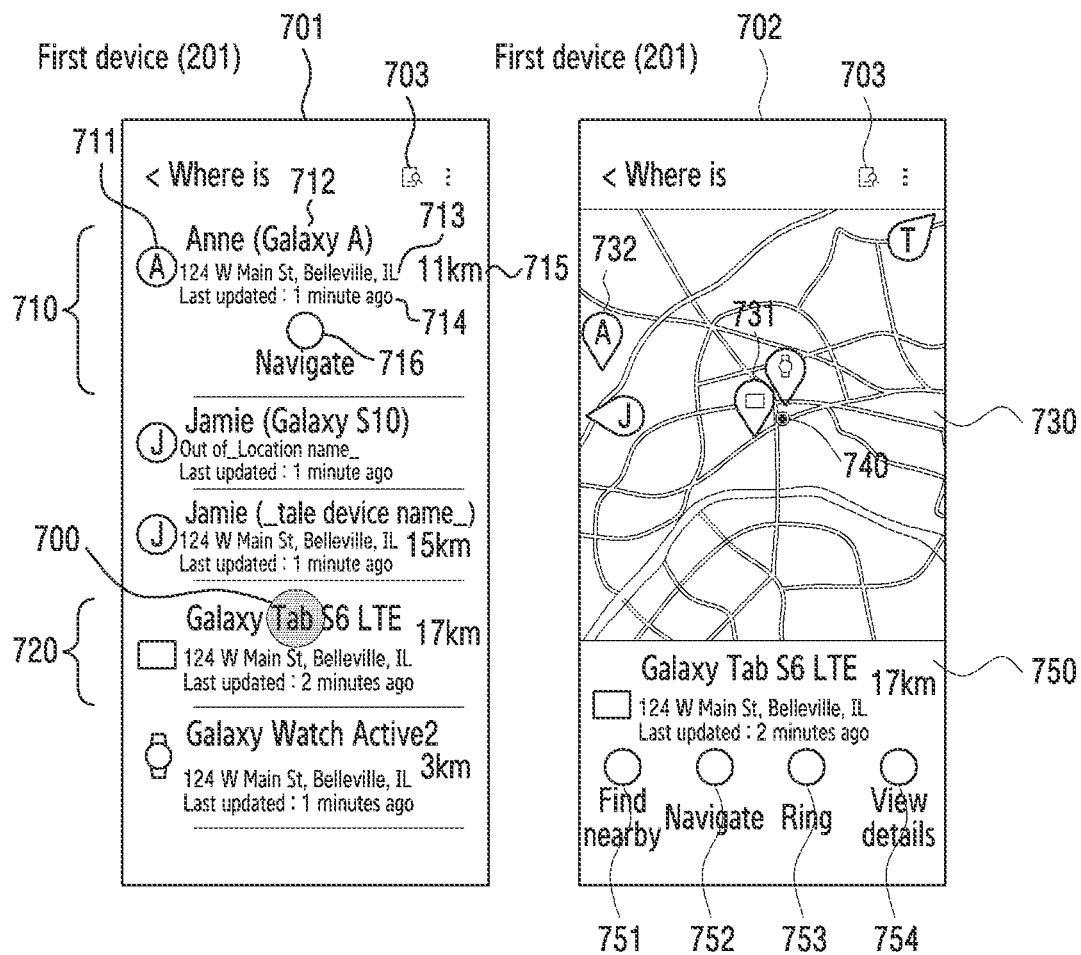
FIG. 7A illustrates a user interface for identifying locations of user devices in a first device according to an embodiment.
FIG. 7B illustrates a user interface for identifying locations of user devices in a first device according to an embodiment.

FIGS. 7A and 7B illustrate a user interface for identifying locations of user devices in a first device according to an embodiment.

Referring to FIG. 7A, a first screen 701 may be an execution screen of an application for providing a location identification service of the first device 201. The first device 201 may display information on user devices registered at the first device 201 in the form of a list. According to an embodiment, the first screen 701 may present a list including an item (not shown) corresponding to the first device card 211, and an item corresponding to the second device card 212. For example, the list of the first screen 701 may include a first item 710 corresponding to a smartphone (e.g., Galaxy A) indicating the first device 201 registered at a user account of the first device 201, and a second item 720 corresponding to a certain tablet (e.g., Galaxy Tab S6 LTE) registered at the user account. In the following description, description of the first item 710 and/or the second item 720 may be applied to other items (e.g., "Jamie (Galaxy S10)", "Jamie (_tale device name_)", and/or "Galaxy Watch Active2") which are not specified on the first screen 701. In some embodiments, the first screen 701 includes a search icon 703 that, upon selection, allows a user to input a search term(s) for sorting and/or identifying one or more item(s) in the list.

In an embodiment, each item included in the list may include a variety of information. For example, the first item 710 may include at least one of an icon 711 indicating the smartphone, a nickname (e.g., Anne) and model name 712 (e.g., Galaxy A) of the smartphone, a last identified location 713 (e.g., 124 W Main St., Belleville, IL), a last time 714 the location is identified (e.g., Last updated: 1 minute ago), a distance 715 from a current location of the first device 201 to the smartphone, and a navigation menu 716 for executing a map application or a map function, based on the current location of the first device 201 and the last identified location 713. Some items may be omitted from those described above. For example, when the location of the device is not identified, at least a part of the last identified location 713, the last time 714 that the location is identified, or the navigation menu 716 may not be displayed.

In an embodiment, the first device 201 may automatically perform operation 631 when the application is executed. In another embodiment, the first device 201 may perform operation 631 by a user input after the application is executed. In yet another embodiment, the first device 201 may perform operation 631 at every predetermined period (e.g., once every 12 hours), and update locations of the user devices 200 registered at the first device 201.

Referring to FIG. 7B, in an embodiment, when a user input 700 of selecting the second item 720 from among various items included in the list occurs, the first device 201 may provide a second screen 702 to the display of the first device 201. The second screen 702 may be, for example, a UI generated based on the second device card 212.

In an embodiment, the second screen 702 may include a map area 730 and a second device card area 750. For example, the map area 730 may be displayed on an upper portion (area) of the second screen 702, and the second device card area 750 may be disposed on a lower portion (area) thereof. However, this is merely an example and the second device card area 750 may be disposed at a location different from the illustrated example. For example, the second device card area 750 may be provided in the form of floating over a map occupying most of the second screen 702. In addition, the location or size of the second device card area 750 may be moved/magnified/reduced by a user input.

In an embodiment, locations of the user devices 200 identified via the server 300 may be displayed on the map area 730. The locations of the user devices 200 may be displayed in the form of an icon. For example, the location of the smartphone corresponding to the first item 710 may be displayed on the map like a first icon 732. In addition, the location of the tablet corresponding to the second item 720 selected by the user input 700 may be displayed on the map like a second icon 731. In an embodiment, the location of the tablet corresponding to the second item 720 selected by the user input 700 may be positioned on a center of the map area 730. A current location 740 of the first device 201 may be displayed on the map area 730. In an embodiment, the current location 740 of the first device 201 may be positioned on the center of the map area 730.

In an embodiment, the second device card area 750 may include a device action menu 751, a navigation menu 752, a ring menu 753, and/or a view details menu 754.

In an embodiment, when the device action menu 751 is selected, the first device 201 may identify whether the second device 202 (e.g., the tablet corresponding to the second item 720) is in the proximity of the first device 201. For example, when the device action menu 751 is selected, the first device 201 may present and/or update the map area 730, based on the location of the first device 201 and location information of the user devices 200, the information being received from the server 300. In addition, the first device 201 may discover the existence of the second device 202 in proximity by using a designated communication protocol (e.g., BLE), in response to the device action menu 751 being selected. When the first device is connected with the second device 202 by using the designated communication protocol, the first device 201 may execute the AR finder 233 and provide the location of the second device 202 via an AR interface, or determine whether to provide the same.

In an embodiment, when the navigation menu 752 is selected, the first device 201 may display a route to the identified location of the second device 202 on the map area 730. In an embodiment, when the ring menu 753 is selected, the first device 201 may attempt to make a call to the second device 202 or make the second device 202 output a designated sound. For example, when the second device 202 supports a call function, the first device 201 may attempt to make a call to the second device 202 in response to the selection of the ring menu 753. In another example, when the second device 202 is connected with the first device 201 via a predetermined short-range communication network, the first device 201 may transmit a designated signal to the second device 202 via the short-range communication network in response to the selection of the ring menu 753. The second device 202 having received the designated signal may generate a pre-defined ring signal (e.g., an alarm, vibration, and/or light emission) in response to the designated signal, so as to notify of its own location.

In an embodiment, when the view details menu 754 is selected, the first device 201 may present more detailed information on the second device 202. For example, the first device 201 may display a state of the second device 202 according to various conditions. When the second device 202 is connected to the first device 201 or another device (e.g., the fifth device 205 or the sixth device 206) among the user devices 200, the first device 201 may display a first state message like "Nearby Finding". The message may be displayed in the form of a pop-up or may be displayed in the second device card area 750 of the second device 202. When the second device 202 is not connected to the first device 201 or another device among the user devices 200, but is not in an "offline finding" state, the first device 201 may display a second state message like "Not in Range Finding". Herein, the "offline finding" state may refer to a state in which it is determined that the second device 202 is lost, and a state in which a threshold time has elapsed after the last time point when the second device 202 is connected with any one of the user devices 200.

In an embodiment, when the second device 202 is not connected to the first device 201 or another device among the user devices 200 and is not in the "offline finding" state, but there is an attempt to find the second device 202, the first device may display a third state message like "Lost mode Finding". When the second device 202 is not connected to the first device 201 or another device among the user devices 200 and is in the "offline finding" state, the first device 201 may display a fourth state message like "Update mode Finding". When the first device 201 attempts to connect to the second device 202, the first device may display a fifth state message like "connecting". In an embodiment, the first to fifth state messages related to the device action menu 751 may be included in the first device card 211 and/or the second device card 212 of FIG. 3.

The above-described first to fifth state messages are examples, and fewer or more state messages may be appropriately configured by a manufacturer or a user according to various embodiments. According to various embodiments, the first device 201 may present battery remaining capacity information of the second device 202. The first device 201 may display the location (location information) of the second device 202, based on a time stamp. The first device 201 may display a current state of the second device 202 by using an appropriate message (device card message). For example, the first device 201 may display, on a display, a message indicating whether the second device 202 is in the proximity of the first device 201, whether the second device is in the proximity of another device (e.g., the fourth device 204) among the user devices 200, where the last location of the second device 202 is, whether the second device 202 is being found, or whether the second device 202 has been found.

In an embodiment, information presented in the second device card area 750 is not limited to the illustrated examples, and may be provided together with at least one of information related to the device action menu 751 and information (e.g., battery remaining capacity information, location information, and/or a device card message) included in the view details menu 754.

Figure 8:
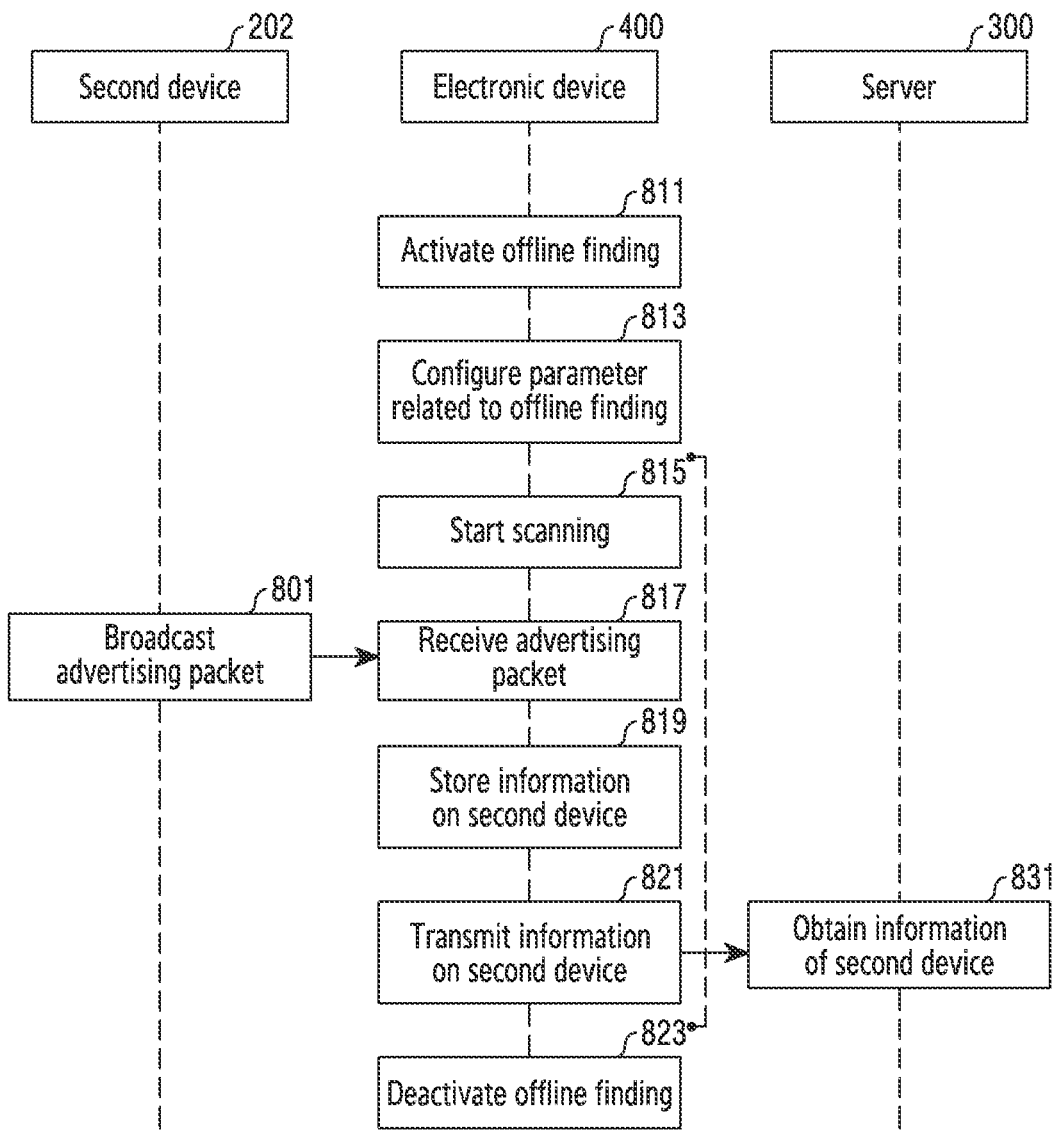
FIG. 8 is a signal flow diagram illustrating a process in which an electronic device performs scanning to find a certain external device according to an embodiment.

FIG. 8 is a signal flow diagram illustrating a process in which an electronic device performs scanning to find a certain external device according to an embodiment.

According to an embodiment, in operation 811, the electronic device 400 may activate offline finding. For example, a user of the electronic device 400 may activate an offline finding function in a setup menu. In another example, the offline finding function may be periodically activated or may be always activated. In yet another example, the offline finding function may be activated only during a designated time interval (e.g., 9 a.m. to 6 p.m.).

According to an embodiment, in operation 813, the electronic device 400 may configure parameters related to offline finding, in response to activating of the offline finding function. For example, parameters such as a scanning period and a scanning window, a scanning interval, a scanning holding time, and/or a wakeup intent may be configured.

Herein, the scanning period may refer to a time during which scanning occurs once. The scanning window may refer to a time during which scanning is actually performed within the scanning period. For example, when the scanning period is 2000 ms and the scanning window is 200 ms, a short-range communication circuit may perform primary scanning for 200 ms after wakeup, and maintain a sleep state for the other time, 1800 ms, and may perform secondary scanning again for 200 ms at the time point when 2000 ms has elapsed after the wakeup.

The scanning holding time may refer to a time for which scanning is held in the above-described scanning period. For example, the electronic device 400 may maintain scanning performed every 2000 ms for 1 hour. The scanning interval may refer to an interval between scanning holding times. For example, when the scanning holding time is 1 hour and the scanning interval is 4 hours, the electronic device 400 may maintain scanning for 1 hour from 00 o'clock and maintain the sleep state for 3 hours, and then may maintain scanning again for 1 hour from 04 o'clock at which 4 hours have elapsed from 00 o'clock.

According to an embodiment, operation 813 may be omitted. When operation 813 is omitted, the parameters related to the offline finding may be configured by a designated configuration value (e.g., a default value).

According to an embodiment, in operation 815, the electronic device 400 may start scanning. Scanning by the electronic device 400 may be performed according to a rule defined by the scanning-related parameters configured in operation 813. The electronic device 400 may activate a first communication circuit which supports short-range communication to obtain an advertising packet obtained from an external device (e.g., the second device 202) while scanning is performed.

According to an embodiment, in operation 801, the second device 202 may broadcast an advertising packet by using a designated short-range communication protocol. For example, the second device 202 may broadcast the advertising packet including identification information of the second device 202 at predetermined time intervals by using a BLE protocol.

In an embodiment, the second device 202 may broadcast the advertising packet according to a change of a network state. For example, the second device 202 may determine whether a current network is available. For example, when a network connection between the second device 202 and the server 300 or the first device 201 is lost, the second device 202 may determine whether the network connection is lost due to an airplane mode. In order for an application of the second device 202 to identify a current network state, the corresponding application (e.g., an application for providing a location finding service) may reside in a memory of the second device 202. In an embodiment, when the electronic device is not in the airplane mode, the second device 202 may set an alarm, and, when a set alarm time arrives, the second device may broadcast the advertising packet. Thereafter, when the network is recovered (e.g., the connection with the first device 201 is recovered), the second device 202 may cancel the set alarm and stop the operation of broadcasting the advertising packet.

According to an embodiment, in operation 817 after starting scanning, the electronic device 400 may receive an advertising packet from an external device, for example, from the second device 202. In operation 817, the electronic device 400 may obtain information on the second device 202 from the information included in the received advertising packet, and store the obtained information in the memory of the electronic device 400 in operation 819.

According to an embodiment, in operation 821, the electronic device 400 may transmit the information on the second device 202 to the server 300, based on the information received from the second device 202. The electronic device 400 may include the information on the second device 202 and location information. Herein, the location information may indicate a location of the electronic device 400 which is measured by the location measurement circuit of the electronic device 400. In operation 821, the electronic device 400 may obtain an encryption key for encrypting the information to be transmitted to the server 300, from the server 300, in order to enhance security, and may encrypt the information on the second device 202 by using the obtained encryption key and transmit the encrypted information to the server 300. For example, the electronic device 400 may transmit at least a part of the information on the second device 202 to the server 300, obtain the encryption key from the server 300, and then encrypt the information on the second device 202 and/or the location information by using the obtained encryption key, so as to transmit the encrypted information to the server 300.

According to an embodiment, in operation 831, the server 300 may obtain the information of the second device 202 and/or the location information from the electronic device 400, and provide information on a location of the second device 202 to the first device 201 in response to a request of the first device 201 (e.g., operation 623 of FIG. 6).

In an embodiment, the electronic device 400 may repeat operations 815, 817, 819, and/or 821 for a predetermined time, for example, for a scanning holding time, and, when the scanning holding time ends, the electronic device may deactivate the offline finding function in operation 823. However, in another embodiment, the offline finding function may be deactivated by a user input or various events such as a battery remaining capacity state of the electronic device 400.

Figure 9:
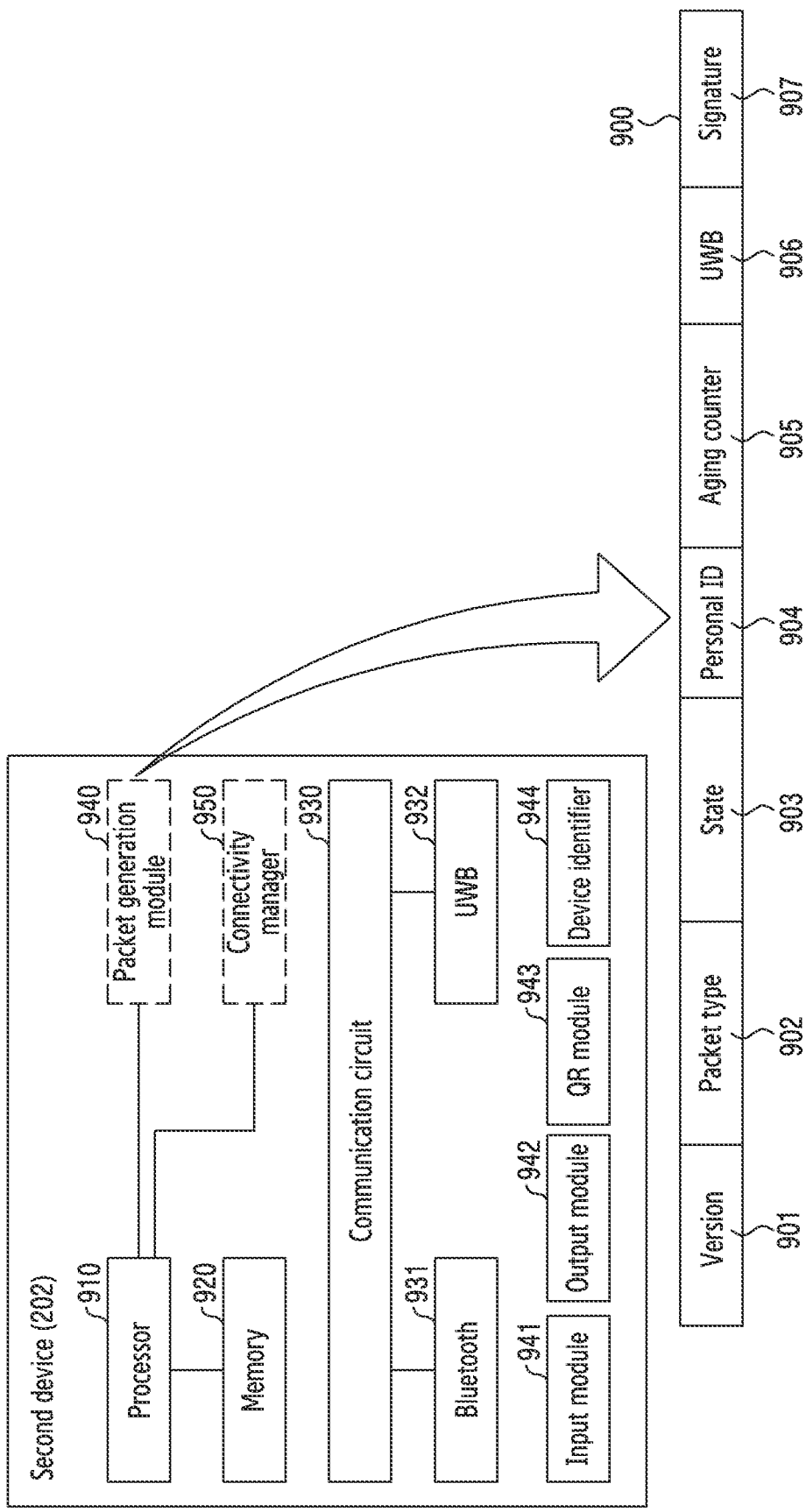
FIG. 9 illustrates a configuration of a second device and a data structure of a packet broadcasted by the second device according to an embodiment.

FIG. 9 illustrates a configuration of a second device and a data structure of a packet broadcasted by the second device according to an embodiment.

Referring to FIG. 9, the second device 202 may include at least one processor 910 (e.g., including processing circuitry), a memory 920, and a communication circuit 930. The elements of the second device 202 illustrated in FIG. 9 are examples and the elements described with reference to FIG. 1 may be appropriately applied to the second device 202. In addition, description of FIG. 1 may be applied to the elements of FIG. 9 that correspond to those of FIG. 1.

In an embodiment, the at least one processor 910 may include various processing circuitry and execute an instruction from the memory 920, and implement a packet generation module 940 and/or a connectivity manager 950. The packet generation module 940 and the connectivity manager 950 may be understood as software modules implemented by executing a program code stored in the memory 920. In addition, in the following description, operations described as being performed by the packet generation module 940 or the connectivity manager 950 may be understood as being performed by the processor 910.

Referring to FIG. 9, the at least one processor 910 may drive the packet generation module 940 by executing instructions stored in the memory 920. The packet generation module 940 may generate an advertising packet 900 including information on the second device 202. The at least one processor 910 may provide the generated advertising packet 900 to the communication circuit 930 through (by using) the connectivity manager 950, and the communication circuit 930 may broadcast the advertising packet 900 by using a designated protocol. According to various embodiments, the communication circuit 930 may support a short-range communication protocol of a Bluetooth 931 and a UWB 932.

In an embodiment, when a wireless channel connection with the first device 201 or the electronic device 400 is established through the communication circuit 930, the at least one processor 910 may control the packet generation module 940 to change information on its own connection state. For example, the at least one processor 910 may configure and change state information to indicate whether there is a channel available in the second device 202 or to indicate a channel which is available. According to various embodiments, the at least one processor 910 may generate the advertising packet 900 including the state information through the packet generation module 940, and provide the generated advertising packet 900 to the communication circuit 930.

In an embodiment, the advertising packet 900 may include version 901, packet type 902, connection state 903, personal ID (privacy ID) 904, aging counter 905, UWB 906, and/or signature 907 fields.

In an embodiment, the version 901 may refer to a version of the advertising packet. Since the advertising packet should be based on a rule shared between the second device 202 which broadcasts the advertising packet and the electronic device 400 which receives and interprets the advertising packet, the version that the advertising packet has may be used to determine a rule according to which the electronic device 400 having received the advertising packet interprets data included in the advertising packet. For example, when the electronic device 400 receives an advertising packet of an old version, not an advertising packet of a recent version, the electronic device may interpret the advertising packet according to a rule corresponding to the old version. In another example, when a version of the electronic device 400 is lower than the version of the advertising packet, the electronic device 400 may update the version through a server (e.g., the server 108 of FIG. 1).

In an embodiment, the packet type 902 may indicate whether the advertising packet is for transmitting information or for requesting information. For example, when the second device 202 broadcasts the advertising packet for the purpose of transmitting its own information, the packet type 902 may indicate a normal advertisement. When the second device 202 broadcasts the advertising packet for the purpose of obtaining information from the first device 201 or the server 300, the packet type 902 may be configured to indicate a request advertisement.

In an embodiment, the connection state 903 may indicate information regarding whether the second device 202 is currently in an offline mode (e.g., offline finding) or an online mode. When the second device 202 is currently in the online mode, the connection state 903 may indicate that the second device 202 is in a connected state with the first device 201, and may indicate information regarding a channel through which the connection is maintained. For example, the connection state 903 may be defined by distinguishing whether a channel to which the second device 202 is connected in the online mode is a normal channel or a reserved channel, or both the two channels are being used. When the second device 202 is currently in the offline mode, the connection state 903 may indicate a state in which the second device 202 is disconnected from the first device 201 (offline state), and may be defined to indicate information regarding how much time elapses after the disconnection. For example, the offline mode may be divided into premature offline, offline, and overmature offline according to an elapsed time after the connection of the second device 202 is broken. Details regarding a criterion for determining a connection state of the second device 202 will be described below with reference to FIG. 10.

In an embodiment, the personal ID 904 may be unique identification information of the second device 202. Additionally and/or alternatively, the personal ID 904 may be a random ID which is generated according to a predetermined algorithm based on the unique identification information of the second device 202. When the personal ID 904 of the second device 202 is not changed, there may be a privacy problem that a location is unintentionally tracked by another nearby device which recognizes the personal ID 904. Therefore, the personal ID 904 may be changed at every designated time (e.g., 15 minutes).

In an embodiment, the aging counter 905 may indicate the number of times that the personal ID 904 is changed after the second device 202 is onboarded. For example, when the second device 202 changes the personal ID 904 every 15 minutes, the aging counter 905 may increase every 15 minutes with reference to a server time (epoch time) which is stored at the time of onboarding. Changing of the personal ID 904 and increasing of the aging counter 905 may be performed simultaneously.

In an embodiment, the UWB 906 may indicate whether the second device 202 is a device which supports UWB communication. The advertising packet 900 may further include information indicating whether the second device 202 supports E2E or MCF, in addition to UWB.

In an embodiment, the signature 907 is a digital signature value which is generated by using a unique key of the second device 202, and may indicate whether the corresponding advertising packet is effective. The signature 907 may be calculated in real time every time the advertising packet is transmitted, and may be added to the fields of the advertising packet.

In various embodiments, the second device 202 may further include an input module 941, an output module 942, a QR code 943, and a device identifier 944. In an embodiment, the input module 941 may be used for identifying a user's intent, and may be in the form of a physical button. For example, when an alarm is generated in the second device 202, the user may stop the alarm by clicking a button provided on the second device 202. In an embodiment, the output module 942 may be used for generating an audio signal and may include a device of a buzzer type. In an embodiment, the QR code 943 may be used for easily performing procedures such as identification, registration, and/or onboarding of the second device 202, and may be printed on the second device 202 or printed on a separate sticker to be attached to the second device 202. In an embodiment, the device identifier 944 may be identification information uniquely given to the second device 202, and may include a product serial number or a short-range communication MAC address of the second device 202.

Figure 10:
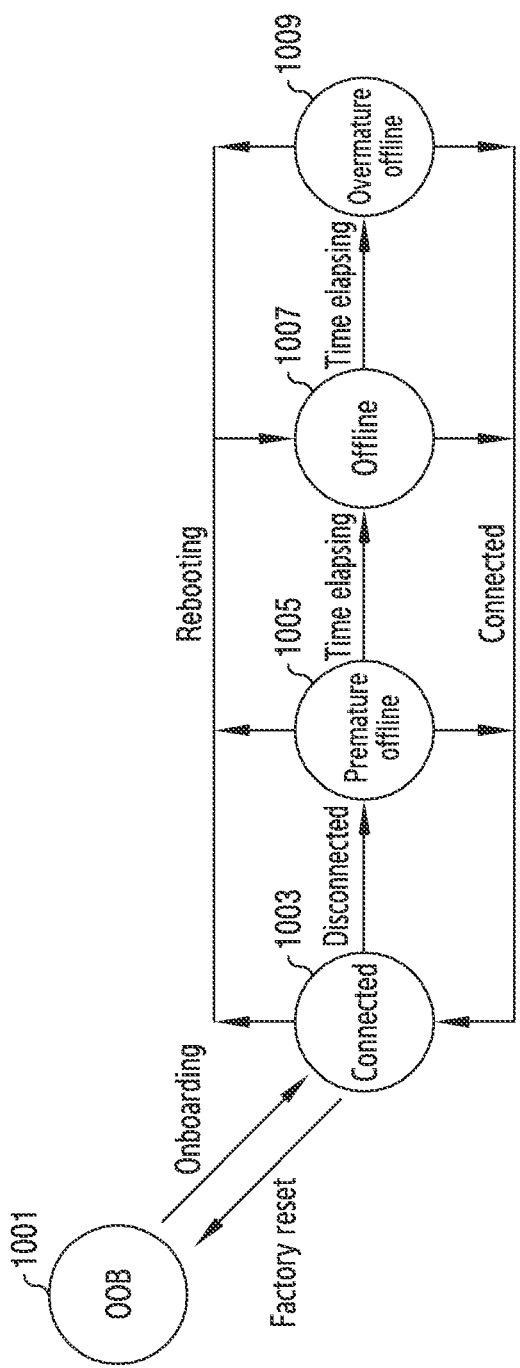
FIG. 10 illustrates a state determination criterion of a second device according to an embodiment.

FIG. 10 illustrates a state determination criterion of a second device according to an embodiment.

Referring to FIG. 10, the second device 202 may change its state to out of box (OOB) 1001, connected 1003, premature offline 1005, offline 1007, or overmature offline 1009 according to a system configuration, whether the second device is connected with the first device 201, and/or an elapsed time after disconnection.

In an embodiment, the OOB 1001 may refer to a state before a system setup is completed after a product box of the second device 202 is opened for the first time. The second device 202 in the OOB 1001 state may be connected with the first device 201 through an onboarding procedure, and registered at the server 300. The second device 202 may be changed back to the OOB 1001 state through a factory reset even when the system setup is completed.

In an embodiment, the connected 1003 may refer to a state in which the second device 202 configures a short-range communication channel with the first device 201 and is connected. The second device 202 may identify the first device 201 by using a shared key registered at the server 300 in the onboarding procedure, and establish a connection. For example, the second device 202 in the connected 1003 state may perform communication with the first device 201, based on a generic attributed profile (GATT) connection. In addition, when a connection with the first device 201 is established in the premature offline 1005, offline 1007, and overmature offline 1009 states, the second device 202 may immediately switch to the connected 1003 state.

In an embodiment, the premature offline 1005 may refer to a state before a first time (e.g., 15 minutes) elapses after the second device 202 is disconnected from the first device 201. The second device 202 may not immediately switch to the offline 1007 state after being disconnected from the first device 210, and may maintain the premature offline 1005 state for the first time.

In an embodiment, the offline 1007 may refer to a state after the first time has elapsed after the second device 202 is disconnected from the first device 201. The second device 202 may switch to the offline 1007 state when the first time (e.g., 15 minutes) has elapsed after the second device enters the premature offline 1005 state, and then maintain the offline 1007 state until a second time (e.g., 24 hours) further elapses. When system rebooting starts in the connected 1003, the premature offline 1005, and the overmature offline 1009 states, the second device 202 may switch to the offline 1007 state. Various determination criteria may be applied to the first time and the second time according to a user configuration or a manufacturer's standard.

In an embodiment, the overmature offline 1009 may refer to a state after the second time (e.g., 24 hours) has elapsed after the second device 202 enters the offline 1007 state. The second device 202 in the overmature offline 1009 state may determine that itself is lost, and may broadcast an advertising packet including identification information of the second device 202 to electronic devices located within a predetermined distance.

Figure 11:
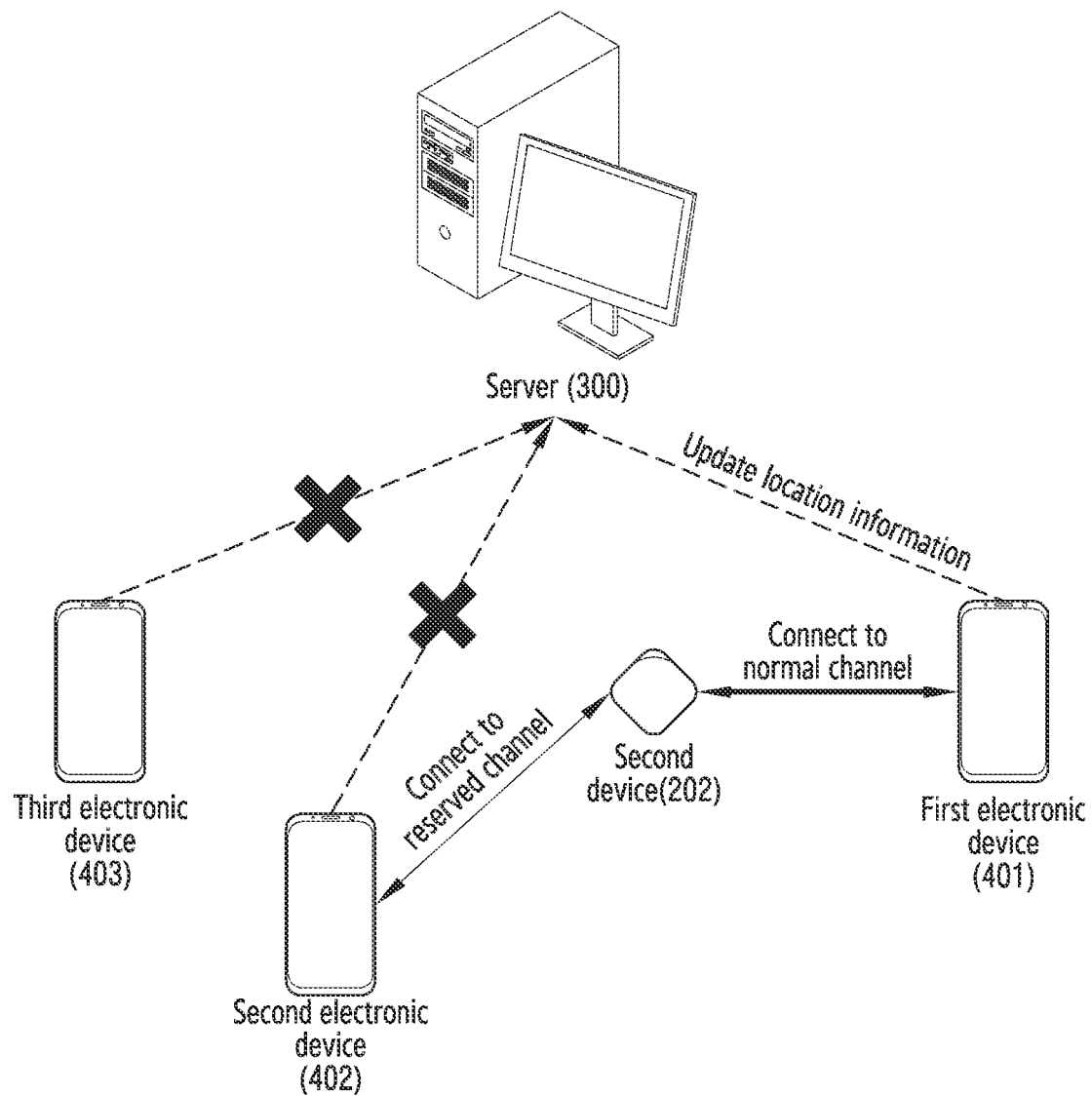
FIG. 11 is a conceptual diagram of a method for managing a wireless network connection of a second device according to an embodiment.

FIG. 11 is a conceptual diagram of a method for managing a wireless network connection of a second device according to an embodiment. In an embodiment, the description of the electronic device 400 described above may be applied to a first electronic device 401, a second electronic device 402, and a third electronic device 403. In addition, the description of the first device 201 among the user devices 200 and the electronic device 101 of FIG. 1 may also be applied to the first to third electronic devices 401, 402, and 403, respectively.

Referring to FIG. 11, the second device 202 may broadcast a first signal including its own identification information and state information by using a wireless communication circuit (e.g., the communication circuit 930 of FIG. 9). According to various embodiments, the first signal may be understood as a message or a packet (e.g., the advertising packet 900 of FIG. 9) broadcasted by the second device 202 as necessary (e.g., when entering an overmature offline state or when a condition configured by a user is satisfied). In an embodiment, the first signal may be obtained by one or more electronic devices located within a predetermined communication distance (e.g., a BLE range) from the second device 202.

In FIG. 11, the first to third electronic devices 401, 402, and 403 may be electronic devices capable of interworking with the second device 202 among peripheral electronic devices which have obtained the first signal broadcasted by the second device 202. For example, the first to third electronic devices 401, 402, and 403 may be understood as a mother terminal of the second device 202, a terminal having been registered with the same user/group account, or a terminal having been identified to have a mutually reliable relationship through service authentication.

In an embodiment, the first electronic device 401 may identify a channel connection state of the second device 202, based on the obtained first signal. For example, when it is identified that the second device 202 is not connected with another electronic device through a normal channel, the first electronic device 401 may measure a location by using at least one sensor, so as to update location information of the second device 202 to the server 300. The normal channel may be a channel through which the second device 202 may transmit or receive data while continuously maintaining a connection with an external device. When the first electronic device 401 receives the first signal, the first electronic device may be estimated to be located at a close distance to the second device 202, the location measured by using the at least one sensor in the first electronic device 401 may be regarded as being the same as the location of the second device 202.

In an embodiment, the first electronic device 401 may request a wireless connection with the second device 202 according to the channel connection state identified based on the first signal. For example, when it is identified that the normal channel of the second device 202 is not connected, since it may be estimated that the second device 202 is not being controlled by a designated terminal, the first electronic device 401 may establish a connection with the second device 202 by using the normal channel.

In an embodiment, when the second device 202 is connected with the first electronic device 401 through the normal channel, the second device may broadcast a second signal including changed state information. For example, the second device 202 may change the state information to indicate that the normal channel is connected, and may include the changed state information in the second signal to broadcast the same.

In an embodiment, the second electronic device 402 may identify the channel connection state of the second device 202, based on the second signal. For example, when it is identified that the normal channel of the second device 202 is connected, the second electronic device 402 may not update the location information of the second device 202 to the server 300 by determining that the second device 202 is being controlled by the another electronic device.

In an embodiment, the second electronic device 402 may request a wireless connection with the second device 202 according to the channel connection state identified based on the second signal. For example, when the second device 202 is connected with another electronic device through the normal channel, the second electronic device 402 may establish a connection with the second device 202 by using a reserved channel. The reserved channel may be a channel through which a connection may be established for a designated time and thus control information may be transmitted to the second device 202 at least temporarily. According to various embodiments, while the second electronic device 402 is connected with the second device 202 by using the reserved channel, the second electronic device may transmit a control command (e.g., an operation control request or an information request) for the second device 202 through the reserved channel. When the control command is not transmitted from the second electronic device 402 through the reserved channel for a designated time or longer, the reserved channel may be automatically terminated and the connection between the second electronic device 402 and the second device 202 may be blocked. A time point at which the reserved channel is terminated is not limited to any one embodiment, and may be configured in various ways according to a configuration of a user or a manufacturer.

In an embodiment, when the second device 202 is connected with the second electronic device 402 by using the reserved channel while maintaining the connection with the first electronic device 401 through the normal channel, the second device may broadcast a third signal including changed state information. For example, the second device 202 may change the state information to indicate that both the normal channel and the reserved channel are connected, and may include the changed state information in the third signal to broadcast the same. According to various embodiments, when both the normal channel and the reserved channel are connected, the second device 202 may not broadcast the third signal. In this case, when an additional channel connection request or control request is received from a peripheral terminal, the second device 202 may transmit a signal including the changed state information to the corresponding terminal.

In an embodiment, the third electronic device 403 may scan the changed state information from the second device 202 to identify that both the normal channel and the reserved channel of the second device 202 are connected. For example, when the third electronic device 403 may determine that the second device 202 is being controlled by another peripheral electronic device, based on the identified channel connection state, and may not update the location information of the second device 202 to the server 300.

In FIG. 11, since the first to third electronic devices 401, 402, and 403 register the location information at the server 300 only when the normal channel of the second device 202 is not connected, unnecessary communication costs may be reduced and network communication load may be reduced.

Figure 12:
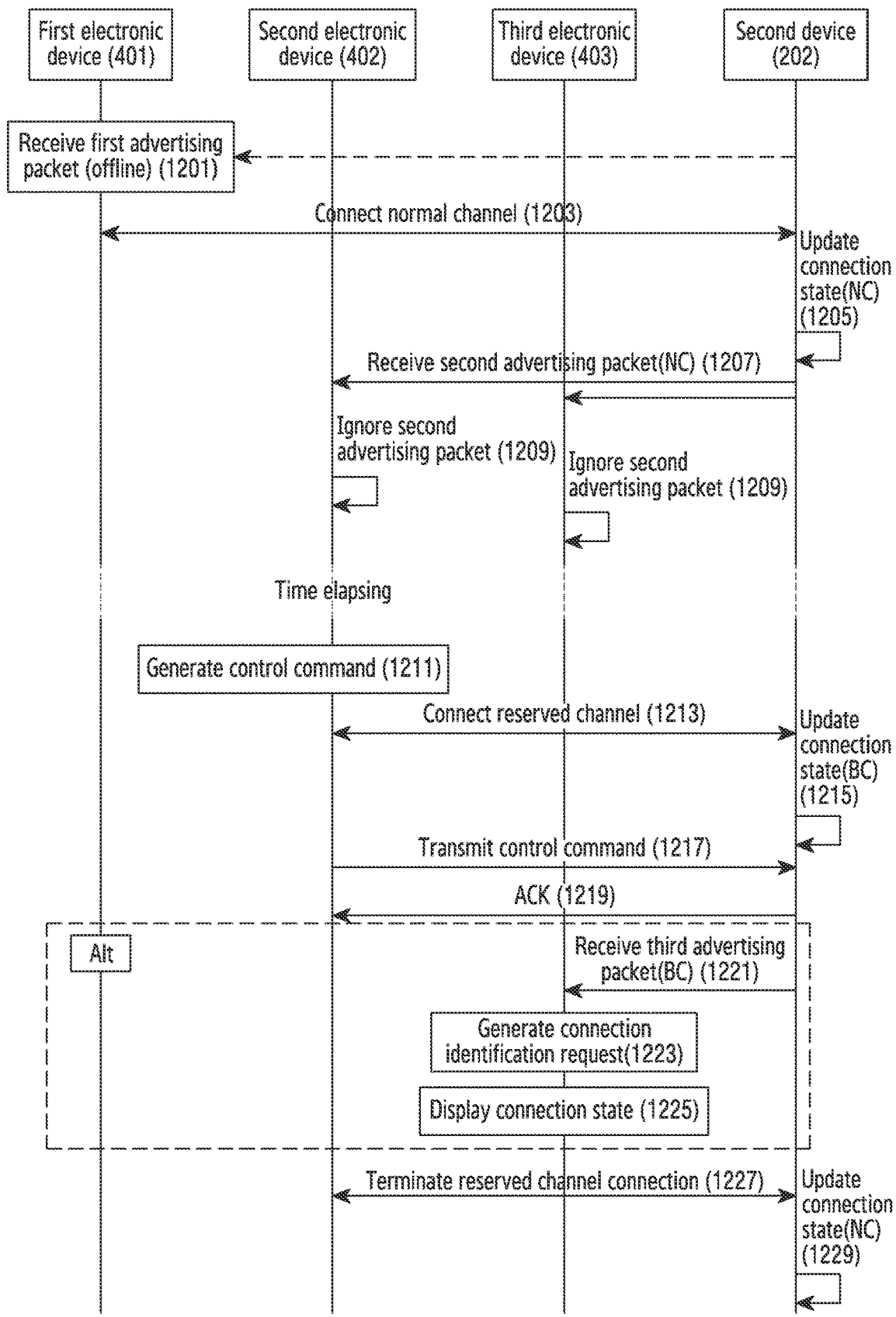
FIG. 12 is a signal flow diagram illustrating a process of establishing and managing a connection between a second device and one or more electronic devices according to an embodiment.

FIG. 12 is a signal flow diagram illustrating a process of establishing and managing a connection between a second device and one or more electronic devices according to an embodiment.

Referring to FIG. 12, in operation 1201, the first electronic device 401 may receive a first advertising packet broadcasted by the second device 202. The first advertising packet may include state information indicating that the second device 202 is in an offline state. For example, the first electronic device 401 may identify that both a normal channel and a reserved channel of the second device 202 are not connected, based on the state information. The normal channel may be a channel through which the second device 202 may transmit or receive data while continuously maintaining a connection in an environment where the second device can connect to other electronic devices, and the reserved channel may be a channel through which a connection may be established for a designated time and thus control information may be transmitted at least temporarily. While maintaining a connection with the second device 202 by using the normal channel or the reserved channel, the first electronic device 401 may transmit a message notifying that the first electronic device is being connected with the second device 202 to the server 300 together with its own positioning information at a designated time period (e.g., 30 minutes or 1 hour). According to various embodiments, while maintaining a connection with the second device 202 by using the normal channel, the first electronic device 401 may disconnect the normal channel when a designated condition is satisfied. For example, when multiple peripheral devices are registered at the first electronic device 401, the first electronic device 401 may be configured to maintain the normal channel for a limited time in consideration of a congestion degree of a wireless network connection and an available system resource. In another example, when the first electronic device 401 detects that a physical distance to the second device 202 exceeds a predetermined communicable distance, the first electronic device may disconnect the normal channel.

According to an embodiment, in operation 1203, the first electronic device 401 may establish a connection with the second device 202 by using the normal channel. The first electronic device 401 may transmit or receive data by interworking with the second device 202 while maintaining the normal channel. According to various embodiments, the first electronic device 401 may configure and transmit whether or not to allow multiple channel connections to the second device 202 in a normal channel connection process. In this case, the second device 202 may establish a connection with another device by using a channel other than the normal channel only when receiving an indication that the multiple channel connections are allowed by the first electronic device 401.

According to various embodiments, the first electronic device 401 may update location information of the second device 202 in operation 1201 or operation 1203. For example, in operation 1201, the first electronic device 401 may determine that the second device 202 is not being controlled by another electronic device, based on the identified state information, and update the location information of the second device 202 registered at the server 300. In another example, when the first electronic device 401 fails to connect the normal channel with the second device 202 in operation 1203, the first electronic device may determine that the second device 202 is lost, and transmit the location information of the second device 202 to the server 300. When the first electronic device 401 succeeds in connecting the second device 202 with the normal channel, the first electronic device may transmit information on a normal channel connection state of the second device 202 to the server 300.

According to an embodiment, in operation 1205, the second device 202 may update state information indicating its own channel connection state. For example, the second device 202 may change the state information to indicate that the normal channel is connected, the second device may add the changed state information to a field (e.g., the state 903 of FIG. 9) of a second advertising packet and broadcast the same. According to various embodiments, when there are multiple normal channels which can be configured in the second device 202, the second device 202 may change the state information when it is identified that all of the multiple normal channels are connected by other electronic devices.

According to an embodiment, in operation 1207, the second electronic device 402 and the third electronic device 403 may receive the second advertising packet broadcasted by the second device 202. The second advertising packet may include state information indicating that the normal channel of the second device 202 is connected. When the second electronic device 402 and the third electronic device 403 identify that the normal channel of the second device 202 is connected, the second electronic device and the third electronic device may determine that the second device 202 is being controlled by another peripheral electronic device and may not update the location information of the second device 202 to the server 300. Accordingly, in operation 1209, the second electronic device 402 and the third electronic device 403 may ignore the second advertising packet. While the second device 202 maintains a connection with the first electronic device 401 by using the normal channel, operations 1207 to 1209 may be repeatedly performed at designated time periods until the channel connection state of the second device 202 is not additionally changed.

According to an embodiment, in operation 1211, the second electronic device 402 may generate a control command for the second device 202. For example, when the second electronic device 402 obtains a user input for controlling a designated operation with respect to the second device 202 (e.g., outputting an alarm or transmitting information), the second electronic device may identify state information on a current connection state of the second device 202, based on an advertising packet recently received from the second device 202. In another example, the second electronic device 402 may obtain the state information from the second device 202 or the server 300 when the user input is obtained.

According to an embodiment, in operation 1213, the second electronic device 402 may establish a connection with the second device 202 by using the reserved channel. For example, the second electronic device 402 may identify that the normal channel of the second device 202 is currently connected, based on the state information obtained from the second device 202, and establish a connection with the second device 202 by using the reserved channel. When the second electronic device 402 succeeds in connecting the second device 202 and the reserved channel, the second electronic device may transmit information on a reserved channel connection state of the second device 202 to the server 300. According to various embodiments, when the second electronic device 402 fails to connect the second device 202 and the reserved channel, the second electronic device may display a message for notifying of connection failure of the reserved channel on a display, or output an audio signal notifying of connection failure.

According to an embodiment, in operation 1215, the second device 202 may update its own state information. For example, the second device 202 may change the state information to indicate that both the normal channel and the reserved channel are connected, and may add the changed state information to a field of a third advertising packet.

According to an embodiment, in operation 1217, the second electronic device 402 may transmit at least one control command for the second device 202 through the previously established reserved channel. For example, while maintaining the connection with the first electronic device 401 through the normal channel, the second device 202 may receive an alarm generation command from the second electronic device 402 at least temporarily through the reserved channel, and output an audio signal in response to the command.

According to an embodiment, in operation 1219, the second device 202 may transmit, to the second electronic device 402, a response (e.g., an ACK message) indicating that the control command has been successfully received from the second electronic device 402.

According to an embodiment, in operation 1221, the third electronic device 403 may receive the third advertising packet including the state information changed in operation 1215. According to various embodiments, when it is identified that both the normal channel and the reserved channel of the second device 202 are connected, operation 1221 may be omitted. In this case, in response to receiving information on an additional channel connection request or control command generation from another peripheral electronic device, the second device 202 may transmit the changed state information to the corresponding device. According to an embodiment, in operation 1223, when a connection identification request or control request for the second device 202 is received from a user, the third electronic device 403 may scan the changed state information from the second device 202 or the server 300. In operation 1225, the third electronic device 403 may identify that both the normal channel and the reserved channel of the second device 202 are connected, and may display information on the connection state of the second device 202. For example, the third electronic device 403 may display a message notifying that the second device 202 is being connected to and controlled by another peripheral device, through the display, based on the identified channel connection state for the second device 202.

According to an embodiment, in operation 1227, the connection of the reserved channel established between the second electronic device 402 and the second device 202 may be terminated. For example, when an alarm command is not generated for a designated time after the second electronic device 402 transmits at least one alarm command for the second device 202 through the reserved channel, the second electronic device 402 may block the connection of the reserved channel. A termination condition of the reserved channel may be applied in various ways according to a configuration of a user or a manufacturer. According to various embodiments, the second electronic device 402 may display a message informing of the termination of the connection of the reserved channel through the display after blocking the connection of the reserved channel.

According to an embodiment, in operation 1229, the second device 202 may update the state information according to the termination of the reserved channel. For example, the second device 202 may change the state information to indicate that the normal channel is connected, and may add the changed state information to a field of an advertising packet and broadcast the same.

Figure 13:
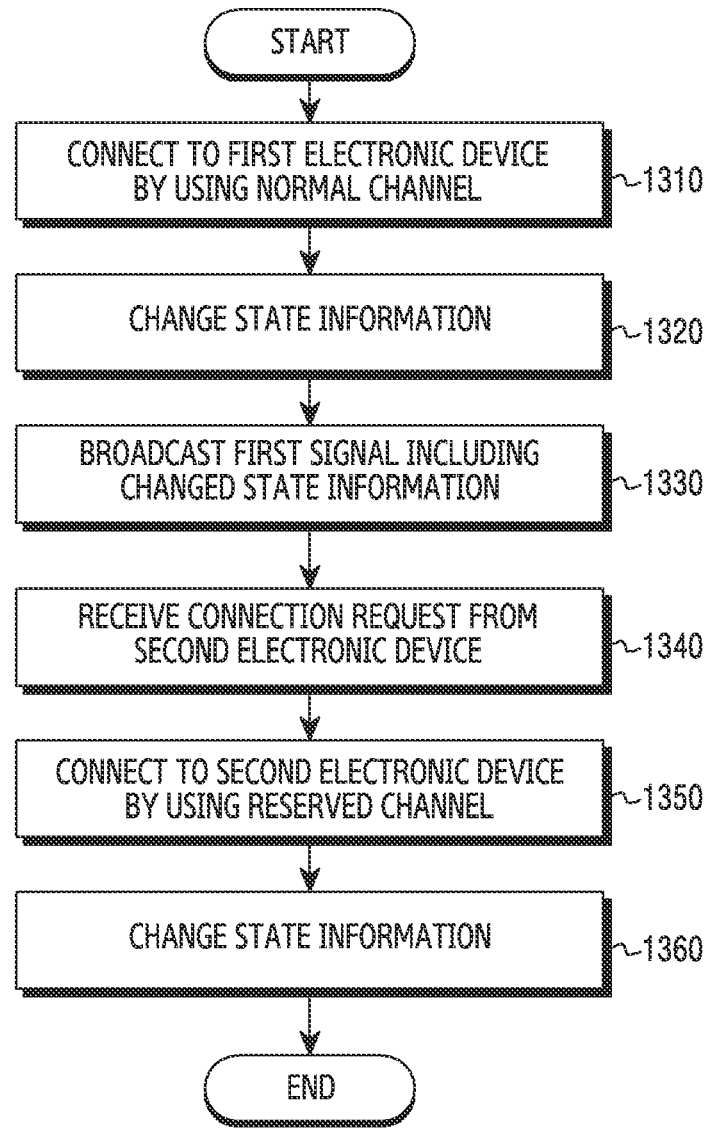
FIG. 13 is a flowchart illustrating an operation of configuring and managing a wireless connection state in a second device according to an embodiment.

FIG. 13 is a flowchart illustrating an operation of configuring and managing a wireless connection state in a second device according to an embodiment. The operations illustrated in FIG. 13 may be understood to be performed by the at least one processor 910 of FIG. 9 or modules implemented by the at least one processor 910.

Referring to FIG. 13, in operation 1310, the second device 202 may connect the first electronic device 401 to a normal channel in response to receiving a connection request from the first electronic device 401. For example, the first electronic device 401 may be a device having been registered with the same account as the second device 202 or a device having been identified to have a mutually reliable relationship through service authentication, among peripheral electronic devices which have received a signal broadcasted by the second device 202 in an offline state. The normal channel may be a channel through which the second device 202 may transmit or receive data while continuously maintaining a connection with an external device. When the second device 202 receives a connection request from the external device and identifies that the normal channel is not connected, the second device may establish a connection with the external device by using the normal channel.

According to an embodiment, in operation 1320, the second device 202 may change its own state information to indicate that the normal channel is connected. The second device 202 may add the changed state information to a field of a first signal.

According to an embodiment, in operation 1330, the second device 202 may broadcast the first signal including the changed state information. The first signal may be obtained by peripheral devices within a predetermined distance capable of enabling short-range network communication from the second device 202.

According to an embodiment, in operation 1340, the second device 202 may receive a connection request from the second electronic device 402. The second electronic device 402 may be a device having been registered with the same account as the second device 202 or a device having been identified to have a mutually reliable relationship through service authentication, among peripheral electronic devices which have received the first signal. For example, when the second electronic device 402 detects that a user input for controlling a designated operation for the second device 202 (e.g., outputting an alarm or transmitting information) occurs, the second electronic device may identify that the normal channel of the second device 202 is connected, based on state information of the first signal, and request connection establishment of a reserved channel.

According to an embodiment, in operation 1350, the second device 202 may establish a connection with the second electronic device 402 by using the reserved channel. The reserved channel may be a channel through which a connection may be established for a designated time and thus control information may be transmitted to the second device 202 at least temporarily.

According to an embodiment, in operation 1360, the second device 202 may change its own state information to indicate that both the normal channel and the reserved channel are connected. The second device 202 may receive at least one control command from the second electronic device 402 while the reserved channel is maintained, and may terminate the connection of the reserved channel when there is no control command for a designated time after the at least one control command is received. When the reserved channel is terminated, the second device 202 may change its own state information again to indicate that only the normal channel is connected.

According to various embodiments, when it is identified that both the normal channel and the reserved channel are disconnected, the second device 202 may re-change the state information to indicate that the normal channel is not connected, and may broadcast a signal including the re-changed state information.

Figure 14:
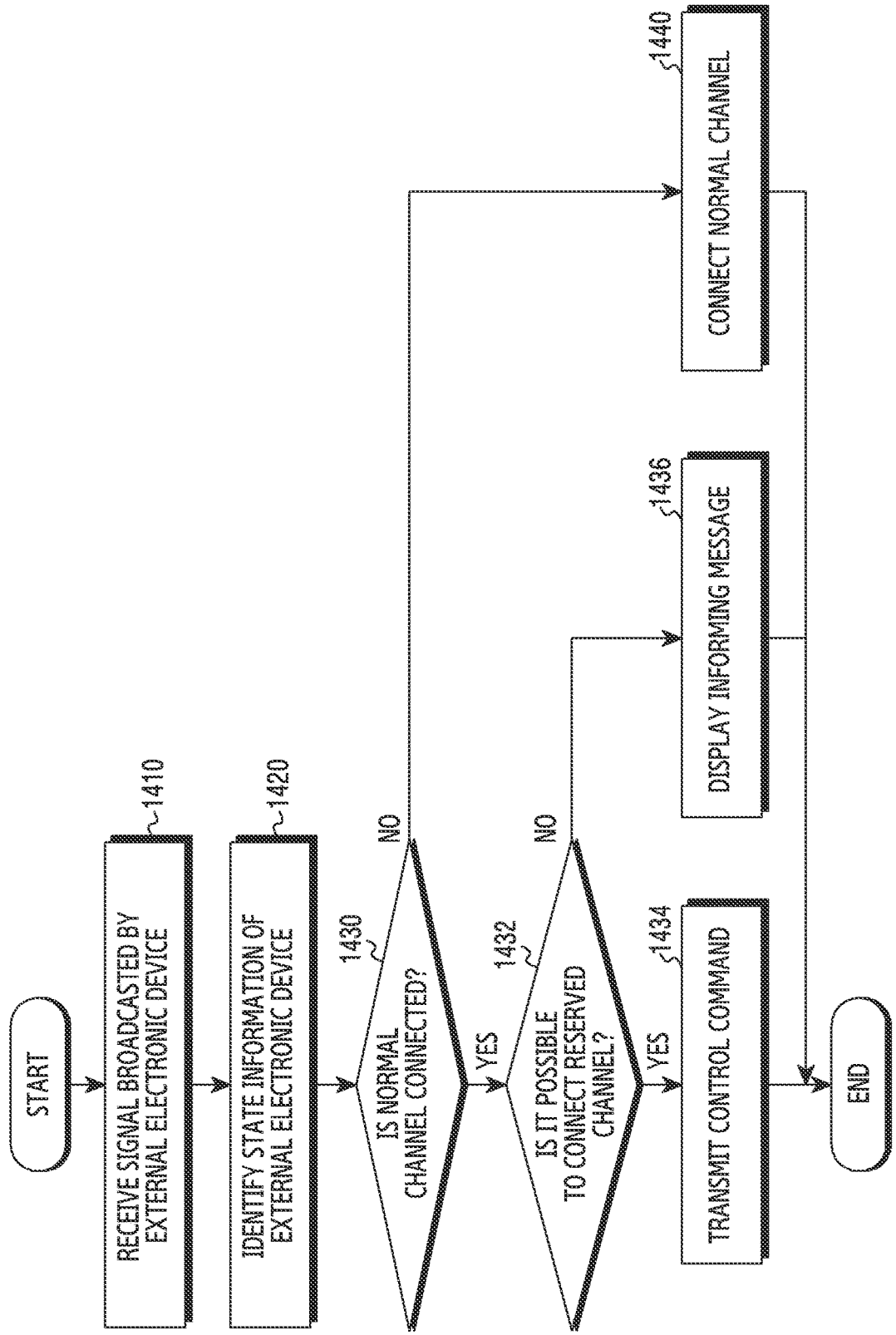
FIG. 14 is a flowchart illustrating an operation performed in response to an identified connection state with respect to a second device in an electronic device according to an embodiment.

FIG. 14 is a flowchart illustrating an operation performed in response to an identified connection state with respect to a second device in an electronic device according to an embodiment. An electronic device performing the operations of FIG. 14 may be a mother terminal of the second device 202, a terminal having been registered with the same user/group account, or a terminal having been identified to have a mutually reliable relationship through service authentication, among peripheral terminals located within a predetermined communicable distance from the second device 202. The operations illustrated in FIG. 14 may be understood to be performed by at least one processor of the first device 201 or the electronic device 400, or the software modules illustrated in FIG. 3.

Referring to FIG. 14, in operation 1410, the electronic device 400 may receive a first signal broadcasted from the second device 202. The first signal may include identification information of the second device 202 and state information relating to a channel connection of the second device 202.

According to an embodiment, in operation 1420, the electronic device 400 may obtain state information of the second device 202, based on the first signal, and identify the obtained state information. The state information may indicate a connection state between a normal channel and a reserved channel which can be connected and established by the second device 202. For example, the normal channel may be a channel through which the second device 202 may transmit or receive data while continuously maintaining a connection with an external device, and the reserved channel may be a channel capable of transmitting control information to the second device 202 for a designated time during which connection establishment is possible. According to various embodiments, when a control request (e.g., an operation control request or an information request) for the second device 202 is input from a user, the electronic device 400 may perform actions corresponding to the identified state information.

According to an embodiment, in operation 1430, the electronic device 400 may identify whether the second device 202 is connected with another electronic device through the normal channel, based on the state information. As a result of the identification, when it is identified that the normal channel is connected (operation 1430—Yes), in operation 1432, the electronic device 400 may identify whether the second device 202 is connected with another electronic device through the reserved channel, and may determine whether a connection of the reserved channel is possible. When the connection of the reserved channel succeeds (operation 1432—Yes), the electronic device 400 may transmit a control command corresponding to the user's control request to the second device 202 through the reserved channel in operation 1434. The electronic device 400 may display, on a display, a message notifying that the electronic device is connected with the second device 202 through the reserved channel while the connection of the reserved channel is maintained. According to various embodiments, when the user's control request is not input for a designated time (e.g., 5 minutes) after the reserved channel is connected, the electronic device 400 may terminate the connection with the second device 202 by blocking the reserved channel. When the connection of the reserved channel is terminated, the electronic device 400 may display a message informing of the termination of the connection of the reserved channel on the display, or output an audio signal notifying of the termination of the connection.

According to an embodiment, when the connection of the reserved channel fails (operation 1432—No), in operation 1436, the electronic device 400 may display, on the display, an informing message indicating that the connection with the second device 202 has failed. For example, when it is identified from the state information that both the normal channel and the reserved channel of the second device 202 are connected, the electronic device 400 may display, on the display, through the informing message, the content that the second device 202 is being controlled by another device and that channel connection is currently impossible. In another example, the electronic device 400 may output an audio signal notifying of the connection failure.

According to an embodiment, when it is identified that the normal channel is not connected as a result of identifying the state information (operation 1430—No), the electronic device 400 may establish a connection with the second device 202 by using the normal channel in operation 1440. According to various embodiments, when it is identified that the normal channel is not connected, the electronic device 400 may measure location information by using at least one sensor (e.g., the sensor module 176 of FIG. 1), and transmit identification information of the second device 202 and the measured location information to the server 300. For example, when the electronic device 400 fails to connect the second device 202 with the normal channel, the electronic device may determine that the second device 202 is lost, and transmit location information of the second device 202 to the server 300. When the electronic device 400 succeeds in connecting the second device 202 with the normal channel, the electronic device may transmit information on a normal channel connection state of the second device 202 to the server 300. In another example, when it is identified that the normal channel is not connected, based on the state information of the received first signal, regardless of whether the connection of the normal channel is successful, the electronic device 400 may determine that the second device 202 is not being controlled by another electronic device, and update the location information of the second device 202 registered at the server 300. Since the electronic device 400 having received the first signal may be estimated to be located at a close distance to the second device 202, the location measured by using the at least one sensor in the electronic device 400 may be regarded as being the same as the location of the second device 202.

Figure 15:
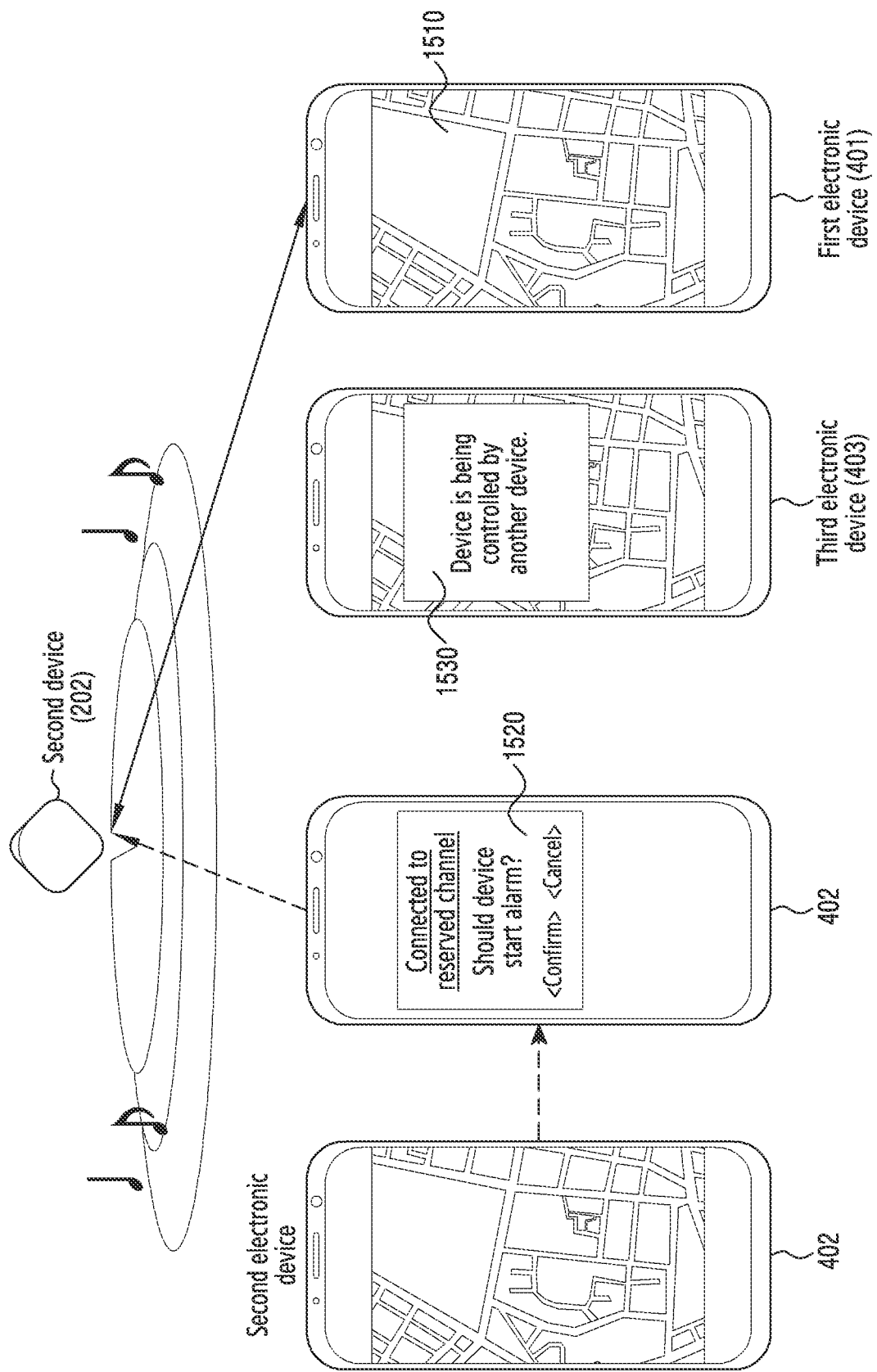
FIG. 15 illustrates a user interface provided based on a connection establishment state with a second device in one or more electronic devices according to an embodiment.

FIG. 15 illustrates a user interface provided based on a connection establishment state with a second device in one or more electronic devices according to an embodiment. In FIG. 15, the first to third electronic devices 401, 402, and 403 may be an electronic device capable of interworking with the second device 202 among peripheral electronic devices which have obtained a signal broadcasted by the second device 202. For example, the first to third electronic devices 401, 402, and 403 may be understood as a mother terminal of the second device 202, a terminal having been registered with the same user/group account, or a terminal having been identified to have a mutually reliable relationship through service authentication.

Referring to FIG. 15, the second device 202 may broadcast a first signal including its own identification information and state information. The state information may indicate connection states of a normal channel and a reserved channel of the second device 202.

In an embodiment, the first electronic device 401 may identify the state information of the second device 202, based on the first signal, and request a connection with the second device 202. For example, when it is identified that the normal channel of the second device 202 is not connected, the first electronic device 401 may establish a connection with the second device 202 by using the normal channel. When it is identified that the normal channel is not connected, the first electronic device 401 may determine that the second device 202 is not being controlled by another device, and update location information on the second device 202 to the server 300. The first electronic device 401 may transmit or receive data by interworking with the second device 202 through the normal channel, and display, on a display, an execution screen 1510 (e.g., the second screen 702 of FIG. 7) of an application or a designated service function, based on the data transmitted or received to or from the second device 202.

In an embodiment, the second device 202 may change its own state information when a connection with the first electronic device 401 is established using the normal channel. For example, the second device 202 may change the state information to indicate that the normal channel is connected, and may include the changed state information in a second signal to broadcast the same.

In an embodiment, the second electronic device 402 may identify the state information of the second device 202, based on the second signal, and request a connection with the second device 202. For example, when it is identified that the normal channel of the second device 202 is connected, the second electronic device 402 may establish a connection with the second device 202 by using the reserved channel. When it is identified that the normal channel is connected, the second electronic device 402 may determine that the second device 202 is being controlled by another electronic device, and may not update the location information of the second device 202. The second electronic device 402 may transmit control information (e.g., an operation control command or an information transmission command) on the second device 202 through the reserved channel while the reserved channel is maintained, and may display a user interface 1520 related to the control information on the display.

In an embodiment, the second device 202 may change its own state information when connected with the second electronic device 402 through the reserved channel. For example, the second device 202 may change the state information to indicate that both the normal channel and the reserved channel are connected.

In an embodiment, when a connection identification request or control request for the second device 202 is received from a user, the third electronic device 403 may obtain a third signal including the changed state information from the second device 202. The third electronic device 403 may identify that both the normal channel and the reserved channel of the second device 202 are connected, based on the third signal, and may display a user interface 1530 including information related to the channel connection state on the display. When it is identified that both the normal channel and the reserved channel are connected, the third electronic device 403 may determine that the second device 202 is being controlled by another electronic device, and may not update the location information of the second device 202.

An electronic device according to an embodiment may include a communication module configured to support a wireless communication service by operating at least two channels, a display module, at least one processor operatively connected with the communication module and the display module, and a memory operatively connected with the at least one processor, wherein the memory stores instructions which, when executed, cause the at least one processor to receive a first signal broadcasted by an external electronic device through the communication module, obtain state information of the external electronic device, based on the first signal, receive a control request for the external electronic device from a user, when the control request is input, identify whether the external electronic device is connected to another electronic device through a normal channel, based on the state information, when the external electronic device is connected to the another electronic device through the normal channel, connect the external electronic device and a reserved channel, when the connection is successful, transmit a control command corresponding to the control request to the external electronic device through the reserved channel, and when the control request is not input from the user for a designated time after the external electronic device and the reserved channel are connected, block the reserved channel connected to the external electronic device.

In an embodiment, the instructions may cause the at least one processor to, when the connection of the reserved channel fails, display a message informing that the connection with the external electronic device has failed, by using the display module.

In an embodiment, the instructions may cause the at least one processor to block the reserved channel connected to the external electronic device and then display a message informing of termination of the connection of the reserved channel.

In an embodiment, the instructions may cause the at least one processor to identify whether the external electronic device is connected to another electronic device through the reserved channel, based on the obtained state information.

In an embodiment, the instructions may cause the at least one processor to, when the external electronic device is not connected to the another electronic device through the normal channel, connect the external electronic device and the normal channel in response to the control request input from the user.

In an embodiment, the instructions may cause the at least one processor to, when the connection of the external electronic device and the normal channel fails, measure location information by using at least one sensor, and transmit the location information to a server.

In an embodiment, the normal channel and the reserved channel may be configured based on a Bluetooth low energy (BLE) communication protocol.

An electronic device according to another embodiment may include a wireless communication circuit, at least one processor operatively connected with the wireless communication circuit, and a memory operatively connected with the at least one processor, wherein the memory stores instructions which, when executed, cause the at least one processor to, in response to receiving a connection request from a first external device, connect to the first external device by using a normal channel, change state information of the electronic device to indicate that the normal channel is connected to an external device, and control the wireless communication circuit to broadcast a first signal including the changed state information.

In an embodiment, the instructions may cause the at least one processor to, in response to receiving a connection request from a second external device, connect the second external device and a reserved channel, and change the state information of the electronic device to indicate that both the normal channel and the reserved channel are connected to the external device.

In an embodiment, the instructions may cause the at least one processor to receive a control command from the second external device through the reserved channel.

In an embodiment, the instructions may cause the at least one processor to, when the control command is not received from the second external device through the reserved channel for a designated time, identify that the reserved channel is blocked, and change the state information.

In an embodiment, the instructions may cause the at least one processor to, when both the channel connections with the first external device and the second external device are identified to be terminated, change the state information to indicate that both the normal channel and the reserved channel are not connected, and control the wireless communication circuit to broadcast a second signal including the changed state information.

In an embodiment, the normal channel and the reserved channel may be configured based on a Bluetooth low energy (BLE) communication protocol.

A method for controlling an external electronic device by an electronic device according to another embodiment may include receiving a first signal broadcasted by the external electronic device, identifying state information of the external electronic device, based on the first signal, receiving a control request for the external electronic device from a user, when the control request is input, identifying whether the external electronic device is connected to another electronic device through a normal channel, based on the state information, when the external electronic device is connected to the another electronic device through the normal channel, connecting the external electronic device and a reserved channel, when the connection is successful, transmitting a control command corresponding to the control request to the external electronic device through the reserved channel, and when the control request is not input from the user for a designated time after the external electronic device and the reserved channel are connected, blocking the reserved channel connected to the external electronic device.

In an embodiment, the method may further include, when the connection of the reserved channel fails, displaying a message informing that the connection with the external electronic device has failed.

In an embodiment, the method may include, when the external electronic device is not connected to the another electronic device through the normal channel, connecting the external electronic device and the normal channel in response to the control request input from the user.

In an embodiment, the method may include, when the connecting of the external electronic device and the normal channel fails, measuring location information by using at least one sensor, and transmitting the location information to a server.

In an embodiment, the connecting of the external electronic device and the reserved channel may include identifying whether the external electronic device is connected to another electronic device through the reserved channel, based on the identified state information.

In an embodiment, the blocking of the reserved channel connected to the external electronic device may include displaying a message informing of termination of the connection of the reserved channel.

In an embodiment, the normal channel and the reserved channel may be configured based on a Bluetooth low energy (BLE) communication protocol.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a communication module;
a display;
at least one processor; and
memory storing instructions which, when executed by the at least one processor, cause the electronic device to:
detect a user input for controlling a designated operation of an external device;
identify that a normal channel of the external device is connected to another electronic device based on a signal broadcasted by the external device including state information indicating that the normal channel is connected;
request connection establishment with the external device using a reserved channel allowing control information transmission to the external device; and
transmit, through the reserved channel, at least one control command to the external device,
wherein the connection of the reserved channel is terminated when there is no further control command for a designated time after the at least one control command is received by the external device,
wherein the normal channel is maintained when there is no further control command for the designated time.

2. The electronic device of claim 1, wherein the instructions, when executed by the at least one processor, cause the electronic device to, in case that the connection of the reserved channel fails, display a message for notifying of connection failure of the reserved channel on the display.

3. The electronic device of claim 1, wherein the instructions, when executed by the at least one processor, cause the electronic device to block the reserved channel connected to the external device and then display a message informing of the termination of the connection of the reserved channel on the display.

4. The electronic device of claim 1, wherein the instructions, when executed by the at least one processor, cause the electronic device to identify whether the external device is connected to the other electronic device through the reserved channel, based on the state information included in the signal broadcasted by the external device.

5. The electronic device of claim 1, wherein the instructions, when executed by the at least one processor, cause the electronic device to:

in case that the external device us not connected to the other electronic device through the normal channel, connect to the external device using the normal channel; and in case that the connection of the external device using the normal channel fails, measure location information by using at least one sensor, and transmit the location information to a server.

6. An electronic device comprising:
a wireless communication circuit;
at least one processor; and
memory storing instructions which, when executed by the at least one processor, cause the electronic device to:
broadcast a signal including state information indicating that a normal channel of the electronic device is connected to an external electronic device;
receive a request for connection establishment using a reserved channel with another electronic device, where the reserved channel allows control information transmission to the electronic device;
receive, through the reserved channel, at least one control command from the other electronic device; and
terminate the connection of the reserved channel when there is no further control command for a designated time after the at least one control command is received by the electronic device,
wherein the normal channel is maintained when there is no further command for the designated time.

7. The electronic device of claim 6, wherein the instructions, when executed by the at least one processor, cause the electronic device to:
change the state information to indicate that both the normal channel and the reserved channel are connected.

8. The electronic device of claim 6, wherein the instructions, when executed by the at least one processor, cause the electronic device to, when the reserved channel is terminated, change the information to indicate that only the normal channel is connected.

9. The electronic device of claim 8, wherein the instructions, when executed by the at least one processor, cause the electronic device to, when both the normal channel and the reserved channel are disconnected, change the state information to indicate that both the normal channel and the reserved channel are not connected, and control the wireless communication circuit to broadcast a second signal comprising the changed state information.

10. A method comprising:
detecting a user input for controlling a designated operation of an external device;
identifying that a normal channel of the external device is connected to another electronic device based on a signal broadcasted by the external device including state information indicating that the normal channel is connected;
requesting connection establishment with the external device using a reserved channel allowing control information transmission to the external device; and
transmitting, through the reserved channel, at least one control command to the external device,
wherein the connection of the reserved channel is terminated when there is not further control command for a designated time after the at least one control command is received by the external device,
wherein the normal channel is maintained when there is not further control command for the designated time.

11. The method of claim 10, further comprising, in case that the connection of the reserved channel fails, displaying a message for notifying of connection failure of the reserved channel.

12. The method of claim 10, comprising:
in case that the external device is not connected to the other electronic device through the normal channel, connecting to the external device using the normal channel;
in case that the connection of the external device using the normal channel fails, measuring location information by using at least one sensor; and
transmitting the location information to a server.

13. The method of claim 10, further comprising identifying whether the external device is connected to the other electronic device through the reserved channel, based on the state information included in the signal broadcasted by the external device.

14. The method of claim 10, further comprising displaying a message informing of the termination of the connection of the reserved channel.

* * * * *